(12) United States Patent
Buchanan et al.

(10) Patent No.: US 12,494,089 B2
(45) Date of Patent: Dec. 9, 2025

(54) METHOD AND APPARATUS FOR ANOMALY ANALYSIS OF A SUBSYSTEM OR COMPONENT OF A VEHICLE THAT EXPERIENCES MECHANICAL VIBRATION DURING ROTATION OF THE SUBSYSTEM OR COMPONENT OF THE VEHICLE

(71) Applicant: NVH Technology LLC, Coatesville, PA (US)

(72) Inventors: Stephen T. Buchanan, Landenberg, PA (US); Thomas S. Buchanan, Landenberg, PA (US); Robert P. Alston, Exton, PA (US); Brandon T. Fanti, Coatesville, PA (US); David A. Fenimore, Coatesville, PA (US); Eric L. Canfield, Downingtown, PA (US)

(73) Assignee: NVH TECHNOLOGY LLC, Coatesville, PA (US)

( * ) Notice: Subject to any disclaimer, the term of this patent is extended or adjusted under 35 U.S.C. 154(b) by 0 days.

(21) Appl. No.: 19/079,736

(22) Filed: Mar. 14, 2025

(65) Prior Publication Data
US 2025/0290790 A1    Sep. 18, 2025

Related U.S. Application Data

(60) Provisional application No. 63/566,613, filed on Mar. 18, 2024.

(51) Int. Cl.
*G01H 13/00* (2006.01)
*G01M 15/12* (2006.01)
*G01M 17/013* (2006.01)

(52) U.S. Cl.
CPC .......... *G01H 13/00* (2013.01); *G01M 15/12* (2013.01); *G01M 17/013* (2013.01)

(58) Field of Classification Search
CPC ..... G01H 13/00; G01M 15/12; G01M 17/013
See application file for complete search history.

(56) References Cited

U.S. PATENT DOCUMENTS

| | | |
|---|---|---|
| 6,595,053 B2 | 7/2003 | Parker |
| 7,103,460 B1 | 9/2006 | Breed |

(Continued)

OTHER PUBLICATIONS

"Invitation to Pay Additional Fees . . . " for PCT/US2025/020215, discussion of US 2023/0366724 in Section 1, mailing date: May 23, 2025.

(Continued)

*Primary Examiner* — Timothy P Graves
(74) *Attorney, Agent, or Firm* — Panitch Schwarze Belisario & Nadel LLP

(57) ABSTRACT

Anomaly analysis is performed for a subsystem or component of a vehicle that experiences mechanical vibration during rotation of the subsystem or component using a database of trends of the axis of rotation and trends of vibrational frequencies of a plurality of different subsystems or components with known anomalies, and an artificial intelligence (AI) model. In operation, a first processor triangulates a location of the axis of rotation of the subsystem or component of the vehicle at any instance of time using motion data collected from a plurality of motion measurement sensors that are attached to the subsystem or component, thereby defining locations of the axis of rotation at a plurality of successive instances of time. A second processor determines, using the AI model and the trends of the axis of rotation in the database, points of interest from the locations of the axis of rotation of the subsystem or component at the successive instances of time. The anomaly of the subsystem or component is identified using the AI model and the trends of the axis of rotation and trends of vibrational frequencies in the database, wherein the AI (Continued)

model uses the points of interest in its processing. One or both of a cause of the anomaly and a recommended corrective action to be taken to address the anomaly is generated using the AI model, wherein the AI model uses the identified anomaly of the subsystem or component in its processing. The AI model outputs one or both of the cause of the anomaly, and the recommended corrective action to be taken to address the anomaly.

14 Claims, 21 Drawing Sheets

(56) References Cited

U.S. PATENT DOCUMENTS

| | | | |
|---|---|---|---|
| 10,445,950 | B1 | 10/2019 | De et al. |
| 10,969,292 | B2 | 4/2021 | Canfield et al. |
| 11,480,491 | B1 | 10/2022 | Canfield et al. |
| 11,656,156 | B1 | 5/2023 | Buchanan et al. |
| 11,731,673 | B1 | 8/2023 | Buchanan et al. |
| 12,181,368 | B1 | 12/2024 | Buchanan et al. |
| 2005/0080543 | A1 | 4/2005 | Lu et al. |
| 2017/0366935 | A1 | 12/2017 | Ahmadzadeh et al. |
| 2019/0324432 | A1 | 10/2019 | Cella et al. |
| 2022/0189215 | A1 | 6/2022 | Erkkilä et al. |
| 2023/0012186 | A1 | 1/2023 | Siegel et al. |
| 2023/0206702 | A1 | 6/2023 | Miners et al. |
| 2023/0366724 | A1* | 11/2023 | Liu ........................ G01H 17/00 |

OTHER PUBLICATIONS

Product brochure for PicoDiagnostics NVH kits, Noise, Vibration and Balancing, downloaded from web page: <https://www.picoauto.com/products/noise-vibration-and-balancing/nvh-overview>, download date: Dec. 29, 2023, original posting date: unknown, 5 pages.
International Search Report and Written Opinion issued Jul. 28, 2025 in International Application No. PCT/US2025/020215.

* cited by examiner

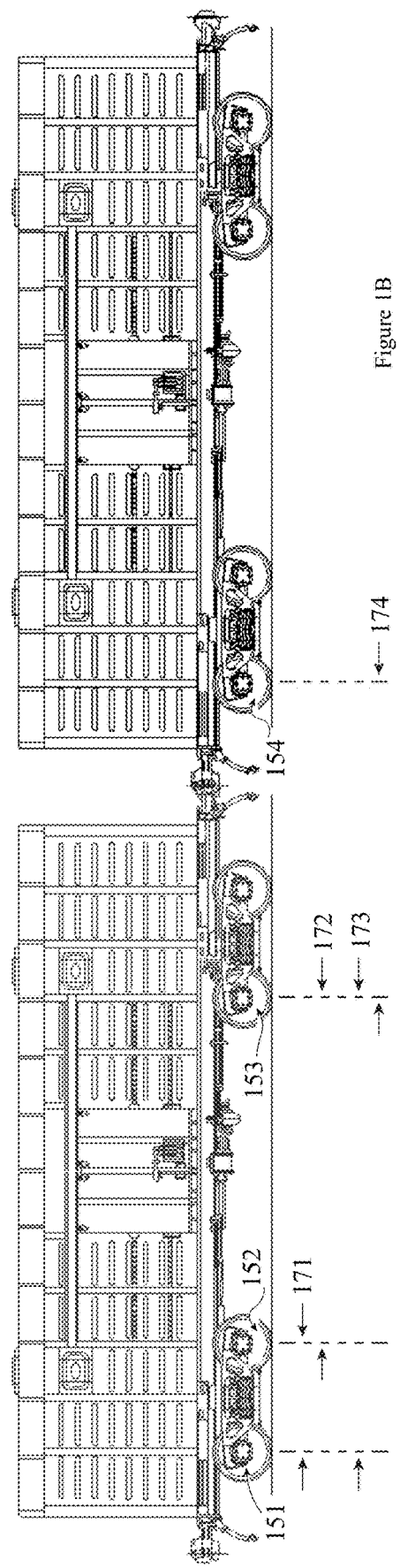

| Subsystem | Vibrational Profile 1 | Vibrational Profile 2 |
|---|---|---|
| Wheel | COR mapping (see FIG 13 and FIG 14) | Mass vibrational frequencies (see FIG 15) |
| Engine | Engine Vibrations | Piston Vibrations |
| Cab | Driver Seat Vibrations | Steering Vibrations |
| ... | ... | ... |

Figure 17

METHOD AND APPARATUS FOR ANOMALY ANALYSIS OF A SUBSYSTEM OR COMPONENT OF A VEHICLE THAT EXPERIENCES MECHANICAL VIBRATION DURING ROTATION OF THE SUBSYSTEM OR COMPONENT OF THE VEHICLE

CROSS-REFERENCE TO RELATED APPLICATIONS

This application claims priority to U.S. Provisional Patent Application No. 63/566,613 filed Mar. 18, 2024 which is incorporated by reference herein.

This application is related to U.S. patent application Ser. No. 19/079,723 filed Mar. 14, 2025 entitled "METHOD AND APPARATUS FOR ANOMALY ANALYSIS OF A PLURALITY OF SUBSYSTEMS OR COMPONENTS OF A VEHICLE THAT EXPERIENCES MECHANICAL VIBRATION DURING OPERATION OF THE VEHICLE."

BACKGROUND OF THE INVENTION

1) Diagnostics

Sensor-based vehicle diagnostics are critical to modern vehicular maintenance and repair. When a vehicle component, such as a tire or engine, begins to fail the repair cost can be minimized if the impending failure is caught in time. However, the repair cost can increase the longer the repair is delayed as the failure may increase over time. Components that are left to fail can even have a cascading effect that can lead not only to increased repair costs but even hazardous operation. It is therefore within the manufacturer's and operator's best interests to diagnose potential failures as early as possible in order to maintain the vehicle's health and operation and to decrease maintenance time and cost.

U.S. Pat. No. 7,103,460 (Breed et al.) teaches the necessity for vehicle diagnostic systems and the need for monitoring the conditions of components over time, both to help diagnostics and maintenance but also for forensic use, such as determining which component failed, resulting in a vehicle crash. Breed talks about the increased necessity for integrated systems and full component diagnostics for early fault detection.

Modern vehicle manufacturers have begun to integrate diagnostic systems to perform "Condition Monitoring" of strategic components in order to increase early fault detection, which increases longevity and minimizes maintenance time and repair costs. "Condition monitoring" is a common industry process of monitoring a particular condition in machinery (such as vibration, temperature, etc.) to identify changes that could indicate a developing failure or fault, which would allow the system to predict when maintenance should be scheduled and even provide preventative actions to reduce further failure. Condition Monitoring is a major part of predictive maintenance which is used for many forms of machinery to establish optimal times to perform maintenance, as opposed to traditionally scheduled maintenance. It also reduces repair costs by catching potential failures before they develop into more expensive failures.

Diagnostic and Condition Monitoring systems use sensors that are typically integrated into components within the vehicle that can then send component condition signals back to a data analyzing element, for example, an onboard computer, that can decode the signal, to determine the health of the component.

Often, these sensors are well known to the operator, such as a fuel gauge in a typical passenger car. Some sensors are more specific and do not directly inform the operator; rather, they gather signals to monitor such conditions as temperature, acoustics, and electrical system health.

To perform constant condition monitoring of components, the sensors in the system must be integrated into the vehicle such that they can gather data continually over time. There are many component monitoring systems, for example U.S. Pat. No. 10,445,950 (De et el.); U.S. Patent Application Publication No. 2017/0366935 (Ahmadzadeh et al.); U.S. Patent Application Publication No. 2022/0189215 (ERKKILÄ et al.); and U.S. Patent Application Publication No. 2023/0206702 (Miners et al.). All of the above patent documents include component monitoring systems that require constant monitoring of component health to effectively function. Therefore, these systems require permanent integration of the sensors into the vehicle. The most common use of these systems, and vehicle diagnostic systems in general, is the integration of these systems at the manufacturing level so that the system can monitor the whole life of the vehicle.

Post-manufacturing installations, while sometimes possible, generally require partial disassembly of the vehicle to access all systems, and are therefore very costly.

2) Adaptability

Modern vehicles have integrated sensors installed on the assembly line; however, the systems are proprietary to the manufacturer. This makes the use and training of the systems complicated, requiring a technician to be trained on each manufacturer's system.

While most modern vehicles have integrated condition monitoring systems of some breadth, such as described by U.S. Patent Application Publication No. 2005/0080543 (Lu et al.), not every component can be integrated into an on-board system due to the operation of the component. Furthermore, many older vehicles do not have integrated sensors on vital components, or even robust onboard computers, and therefore cannot have effective diagnostic capabilities, thereby leading each technician to do in-depth forensics to identify issues.

While some vehicles may have integrated systems, a technician must be acquainted with each system to retrieve the relevant diagnosis, restricting the use of the system to a technician specifically trained for the vehicle model or manufacturer. This creates diagnostic challenges for those without access to appropriate training.

A single system with universal access to the vehicle's current health, able to adapt and be used for any make or model or type of vehicle, streamlines the labor costs and time for correction.

3) Communication

Current systems are hardwired into a vehicle's electronics. Many systems also require the use of an On Board Diagnostics (OBD) reader to gain vehicle diagnostic information. As disclosed in U.S. Patent Application Publication No. 2023/0206702 (Miners et al.), this limitation ends up with non-upgradable sensors and systems. As technology increases, sensors cannot be replaced without replacing the whole system. Miners et al. attempts to find a solution by removing the computation and software side of the diagnostic systems to provide access to upgrade those elements. However, due to the nature of condition monitoring diagnostic systems, the sensors are still required to be integrated into the vehicle for lifelong data recording to identify initial degradation of components.

While remote communication is a possibility, the necessity of supplying electrical power to the sensors makes remote communication impractical when considering integrated, life-long data recording. When considering integrated systems, it is more practical to use hard-wired sensors that access the vehicle's own power and electrical system for data collection.

4) Anomaly Recognition

There are many forms of anomalies that require diagnostic systems in vehicles. The sensor type can help with the component and fault or anomaly of focus. These types of sensors can include electrical sensors, temperature sensors, pressure sensors, acoustic sensors, and vibration sensors. Electrical sensors are integrated into the electronics of the vehicle to detect any anomalies within the electrical system, while the temperature and pressure sensors can be used to monitor such things as lubrication issues, overheating, potential leaks, and blockages. Acoustic sensors can be used for cabin noise or road noise. It is commonly known that many mechanical issues in a vehicle manifest themselves as a vibrational signal. As such, vibration sensors can be used to detect "vibrational anomalies" which directly correlate to a mechanical issue in the vehicle.

As the components within vehicles change from vehicle to vehicle, mechanical vibrations are a universal anomaly present in all vehicle types. For example, passenger cars and trucks have many types of sensors, e.g., fuel gauges and tire pressure gauges, but railcars may not and their electrical systems are drastically different.

"Vibrational anomalies" of a vehicle refers to any repetitive motion of a vehicle or component or assembly of a vehicle that could cause either a quality-of-ride issue or wear on a part of the vehicle. Vibrational anomalies can be caused by a variety of issues such as, but not limited to, engine issues, drive chain issues, rotor or propeller issues, chassis or wheel issues, including tire balancing issues. Most vibrational anomalies commonly occur at the main source of the vehicle's motion, that is, wheel assemblies, engines, rotors or propellers. As such, the ability for a diagnostic system to identify anomalies from these sources is of primary importance.

When considering sources of motion, most anomalies that occur due to rotating assemblies and parts, such as those listed above, are due to an "imbalance." That is, any rotating element in a vehicle will present an anomaly that can be termed an "imbalance." An "imbalance" presents as one of three categories:

1) Geometric miss-assembly: such as a wheel not properly attached or a rotor blade oriented incorrectly,
2) Geometric profile wear: such as a flat edge developing on a rail wheel or a divot on a wheel rim due to striking a pothole,
3) Manufacturing defect: such as non-uniform material in a tire or a weakening at a location on a part due to manufacturing.

All three categories can be termed "imbalance" as they manifest as a dislocation of the center of rotation from the center of mass. Imbalance will manifest as the rotating elements attempt to rotate about a different point than the provided motion source, axle, etc. While the manifestation of the anomaly can be termed the same, the vibrational signal and corrective response differ. However, as all categorical rotational anomalies can be surmised as a shift in the center of rotation, a method for detecting a change in the center of rotation or a change in the center of mass can be applied to each type of imbalance and thereby identify the anomaly. From identification, the addition of assembly-specific knowledge can be used to provide the appropriate corrective action.

As the most common forms of vehicle transportation involve wheeled vehicles, the wheel assembly provides a well-rounded and complete subject for discussion. Therefore, within one aspect of the current invention, when discussing wheel-based anomaly detection and correction, it can be inferred that such methods can be applied to an "imbalanced" assembly of any vehicle. Hence, for the sake of brevity, the following discussion will focus on wheel-based anomalies.

When considering tires on vehicles, one of the most common tire and wheel vibrational anomalies is "tire balance." "Tire balance" refers to the distribution of mass within a vehicle tire or the entire wheel assembly, including the rim on which the vehicle tire is mounted. Tire balance may also be referred to as "tire unbalance" or "tire imbalance." As described in U.S. Pat. No. 6,595,053 (Parker), which is incorporated by reference herein, the balancing of vehicle wheel assemblies is most often accomplished by removing the tire/wheel assemblies from the vehicle and mounting each of the assemblies on an off-car-balancer. But, as described in U.S. Pat. No. 6,595,053 and further described in U.S. Pat. No. 11,480,491 (Canfield et al.), on-car balancers can overcome some of the significant limitations of off-car balancers.

Simple off-car tire balance devices such as the Gunson® Static Wheel Balancer are designed to test tire balance while stationary, placing weights on the rim away from the center of the tire until the tire is balanced. More sophisticated examples of off-car tire balancers include The Road Force® Elite wheel balancer, a dynamic balancer that is commercially available from Hunter Engineering Company, Bridgeton, Missouri. Their off-car dynamic balancer rotates the tire/wheel assembly, measures the imbalance forces, and displays the amount and location of weight to add to the wheel to bring the tire/wheel assembly into a balanced condition. Most off-car dynamic balancers spin the wheel at relatively low and fixed speeds (the average equivalent of 30 mph, or less, depending upon the tire radius). But many vibrational anomalies, such as tire eccentricity, only occur and are only detectable at higher speeds, due to the resonant frequency being found much higher, generally over 60 mph, according to PICO Technologies, a leading expert in automotive noise, vibration and hardness (NVH). Off-car dynamic balancers will not detect most anomalies induced by high speeds, a change in vehicle weight which changes the applied road force, or anomalies caused by other systems of the vehicle.

U.S. Pat. No. 11,480,491 and additional patents from NVH Technology LLC (formerly, assigned to Balanced Engineering Solution, LLC), discuss removably attached devices for vibrational anomaly detection of vehicles during operation. This allows for real-time data collection of a vehicle during normal on-road operation, allowing for more accurate capturing of the vibrations induced. Another similar device that allows for in-operation data collection for diagnostics is the Pico Diagnostic NVH kit that is commercially available from PICO Technology (www.picoauto.com and www.picotech.com), which is used for whole-vehicle vibrational analysis, including the engine. A limitation of the PICO device is that it requires tethering to both a computer and to the vehicle's OBD reader, limiting its sensor capabilities to non-rotating components and to components within reach of the cabin.

Detecting anomalies that occur at high-speed are important because they are often the types of vibrations that concern many drivers, yet are the most difficult to detect and diagnose. To identify an anomaly in vibrational data relative to normal operation, a healthy component profile is generally employed. These Condition Monitoring databases are generated by consolidating monitored operation data while the vehicle is in normal operation. Ideally, an engine sensor would monitor the engine noise and create a "healthy" noise profile while the engine is in perfect condition right from the factory. While in-operation data are ideal to create these databases, on-vehicle in-operation data has been difficult to collect on all components of the vehicle, either due to devices being permanently mounted in specific locations or being temporarily tethered to computers which limit them from any rotating components. With the use of an on-vehicle removably attached remote data collection device, such as described in U.S. Pat. No. 11,480,491, when placed in multiple locations, true in-operation data of rotating components and other vehicle components can be collected, which herein by reference is also referred to as a system. By collecting data at speeds much lower than resonance frequency, also referred to herein as "baseline speed," a baseline level can be found that represents a healthy operation. When coupling the derived baseline with resonating vibrational profile, anomaly diagnosis is possible within a single test operating under a minimum of two different conditions, removing the need for long term monitoring data.

SUMMARY OF THE PRESENT INVENTION

It is the object of the present invention to describe a removable, adaptable, diagnostic system for vehicles.

The present invention seeks to introduce a new form of universal diagnostics for vehicles able to adapt to any vehicle or diagnostic objective through the use of a removable system comprising removably-attached sensors.

The diagnostic system includes three components: removable sensors that are adaptable for studying different problems, a means of communication between the sensors and a communication device, and a means of anomaly recognition.

The diagnostic system herein is not tied directly to a vehicle's onboard computer system. Rather it is independent of any proprietary monitoring system embedded in any vehicle. This allows it to be employed to diagnose problems on nearly any kind of moving vehicle: passenger cars, trucks, construction vehicles, military vehicles, rail cars, seacraft, or aircraft. To accommodate its lack of information from a vehicle's monitored sensors, a database of previously detected anomalies can be used to determine the cause and severity of an anomaly. With the assistance of artificial intelligence (AI) models, the database can be used to filter relevant sensor data needed for specific component diagnosis.

The system uses removable sensors that can be placed on the component(s) or region(s) of interest of the vehicle allowing the system to adapt to vehicle specific components. A single sensor may be able to detect some anomalies, but multiple sensors are typically employed for most applications. Removable sensors allow for the system to physically adapt to any vehicle by adjusting the system to vehicle-specific components.

The system is also able to address specific problems through the selection or exclusion of components for diagnostics, allowing for a range of diagnostic possibilities; from full vehicle diagnostics to analysis of individual subsystems or components.

For a single system to be able to adapt to a wide range of applications, sensor combinations and vehicle sizes, a robust communications system is needed to maintain connection over the wide application configurations and vehicle sizes. The system remotely connects to a communication system using standard approaches, examples of which include Bluetooth®, Wi-Fix, NFC, radio, optical, or acoustic methods. The data collected from the sensors can be downloaded to the communication device(s) while on or off the vehicle and analyzed by devices or servers either on or off the premises.

The system diagnoses vehicles through anomaly recognition of individual components, selecting components of interest and can be enhanced through the use of database-driven AI-trained models for each component where the database is populated by known anomalies. This allows anomalies associated with those components to be readily identified. The database can be expanded over time to identify additional anomalies as they are identified, keeping up with ever upgrading and evolving vehicle design.

The ability to place removably attached sensors on any desired component of any type of vehicle, with the use of algorithms and the addition of AI models to recognize and diagnose known components for anomalies, creates a robust universal system for adaptable vehicle diagnostics.

BRIEF DESCRIPTION OF THE DRAWINGS

Preferred embodiments of the present invention will now be described by way of example with reference to the accompanying drawings:

FIG. 1B shows a removably attached system on a rail.

FIG. 17 is a representation of a database holding vibrational profiles.

DETAILED DESCRIPTION OF THE INVENTION

Figure 1A:
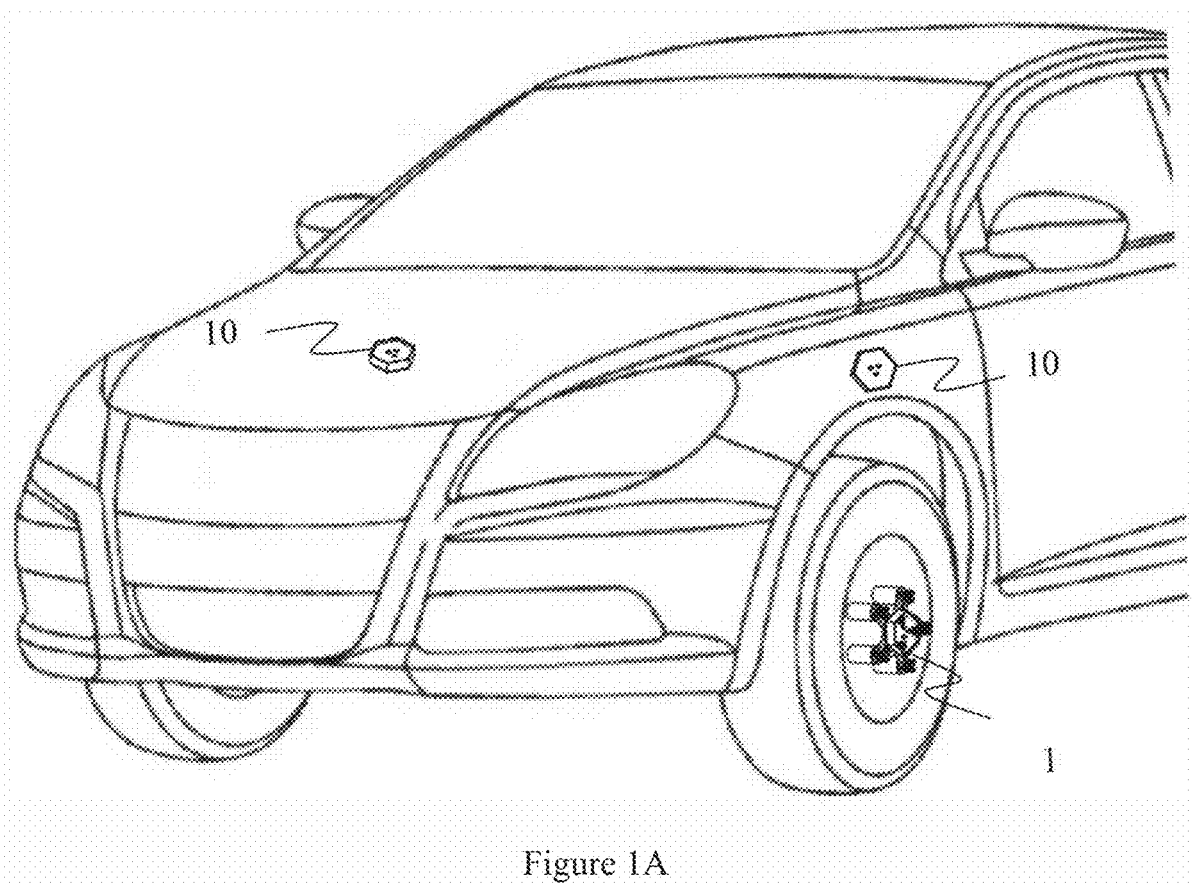
FIG. 1A shows a removably attached system on a vehicle (car).

Certain terminology is used herein for convenience only and is not to be taken as a limitation on the present invention. The words "a" and "an", as used in the claims and in the corresponding portions of the specification, mean "at least one".

U.S. Pat. No. 11,480,491, and the discussion below, also refer to a vehicle being "in operation." For a passenger vehicle or truck, e.g., a motor vehicle, an electric vehicle (EV), "in operation" includes having the vehicle in motion or having the vehicle's engine on (in the case of a motor vehicle), but not necessarily having the vehicle in motion. For other types of vehicles, such as railcars, being "in operation" requires having the vehicle in motion.

1. Diagnostic System

Traditional diagnostic systems use integrated sensors that measure the health of a component over its lifespan. The most advanced systems of this kind compare current data to historic data to evaluate if a component will be in need of maintenance in the future. A removable system, such as the invention at hand, does not rely on the knowledge of the component's overall history but compares current data to a baseline profile.

For a study of problems related to vehicle vibrations/acoustics, baseline is achieved by operating the vehicle outside of the resonance frequency of the issue, usually at low speeds or low vibrations. This provides a desirable baseline on which "healthy" operation can be used for diagnosis. This is due to vibrational problems typically occurring at a resonant frequency. Operation outside the frequency of resonance typically manifests as regular behavior of the component and can therefore be used to create a baseline profile. Relying on a baseline compensates for the lack of historically monitored data, as manufacturing data can be used to provide vehicle information, e.g., the wheel radius, tire designated maximum pressure, the vehicle manufacturer's model designated weight, etc.

To improve the removable system and accommodate its lack of monitored vehicle specific data, a database of previously detected anomalies from the same or similar components can be used to determine the cause and severity of an anomaly. With the assistance of an artificial intelligence (AI) model, the database can be used to identify relevant data needed for specific component diagnosis and to isolate elements of the vibration profile for further investigation. This allows the system to adapt to any issues and to adapt to any vehicle on which the AI model has been trained. In order for the software to adapt and diagnose anomalies, the sensors must be as physically adaptable as the software.

2. Adaptability/Removable

2.1. The Need for Adaptability

The objective of this invention is the creation of a single removably attached system that can diagnose anomalies in a plurality of vehicle types, such as passenger cars, trucks, construction vehicles, military vehicles, rail cars, seacraft, and aircraft, and is able to diagnose anomalies across all makes and models of vehicles. This is accomplished by shifting the focus of the diagnostic system from manufacturer-specific components to the specific component type being diagnosed. For example, any wheel-driven vehicle, rail, commercial or passenger car, can exhibit the same wheel-induced anomalies, as produced by vehicle-specific conditions. One of the most prevalent is that of "imbalance" where, for a vehicle with tires, this can be due to Geometric miss-assembly, Geometric profile wear, or Manufacturing defect, as explained in the background section. These are significant problems. Railcar wheel imbalance is one of the most prevalent causes of train derailment, as explained in U.S. Pat. No. 11,656,156 (Buchanan et al.) and U.S. Pat. No. 11,731,673 (Buchanan et al.), both of which are incorporated by reference herein. In vehicles (cars), wheel imbalance is one of the major causes of ride comfort issues.

As mentioned above, most car manufacturers consider diagnostic systems to be proprietary and, as such, a technician trained on one single system becomes a specialist. The need for a single system that can adapt to the vehicle without the need of a specially trained technician is desired.

2.2. Achieving an Adaptable System

Figure 2:
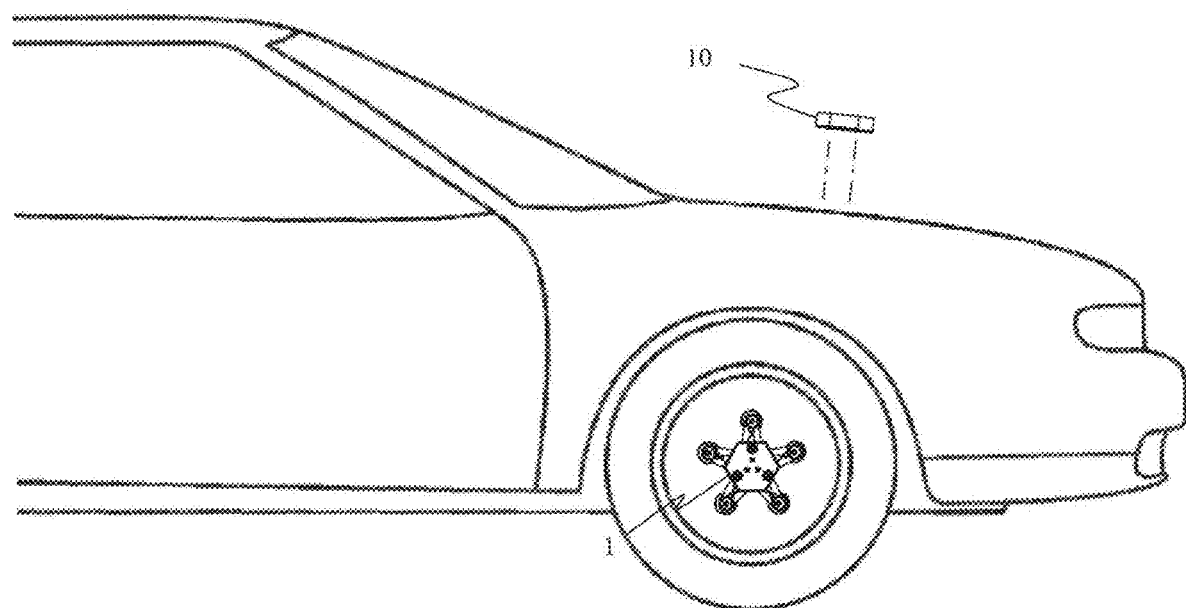
FIG. 2 shows the system and how components can be added and removed.

For such a system to be adaptable, the number and type of sensors must vary to accommodate vehicle differences. This ability to include or exclude sensors is driven by the vehicle type and the objective of the system. One example of such a removable system is shown in FIG. 1A which shows a passenger vehicle with a removable system comprising a removably attached wheel sensor 1 and multiple sensors 10 removably attached to the body of the car. This same system could be physically placed on a rail car, as shown in FIG. 1B, which shows two rail carriages with multiple options where removably attached wheel sensors can be placed on the first wheels 151, second wheels 152, third wheels 153, and the first wheels of the second carriage 154. These options allow for specific wheels to be analyzed, and for specific carriages to be analyzed. FIG. 2 shows an embodiment of the system on a passenger car and how components can be added or removed on a passenger car or truck. With a removable system, the area of analysis and the component(s) of selection are of the utmost importance.

While modern vehicles tend to have many sensors, some diagnostic information may not be measured by onboard sensors and may be better obtained by sensors that can be installed temporarily for diagnostic purposes and then readily removed. These removable systems can provide enhanced diagnostics that a fixed system installed in the vehicle and integrated with the vehicle's onboard computer system cannot.

2.3. Removable Sensors

Figure 3:
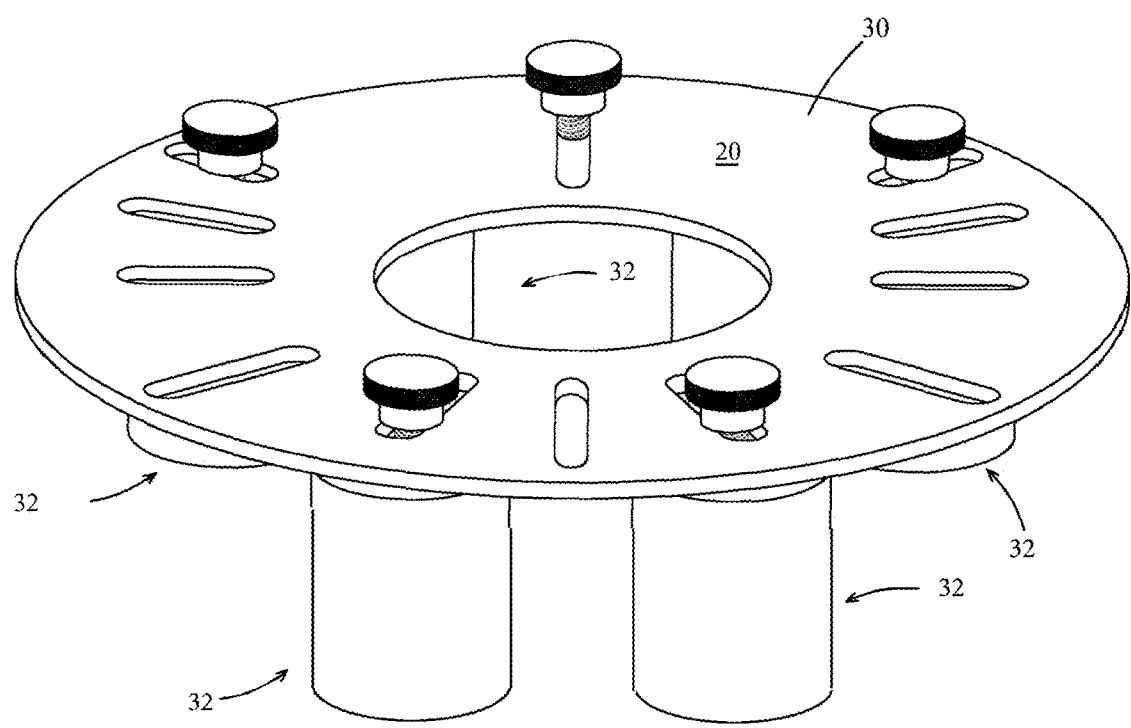
FIG. 3 shows a prior art mounting apparatus for a removably attached sensor.
Figure 4:
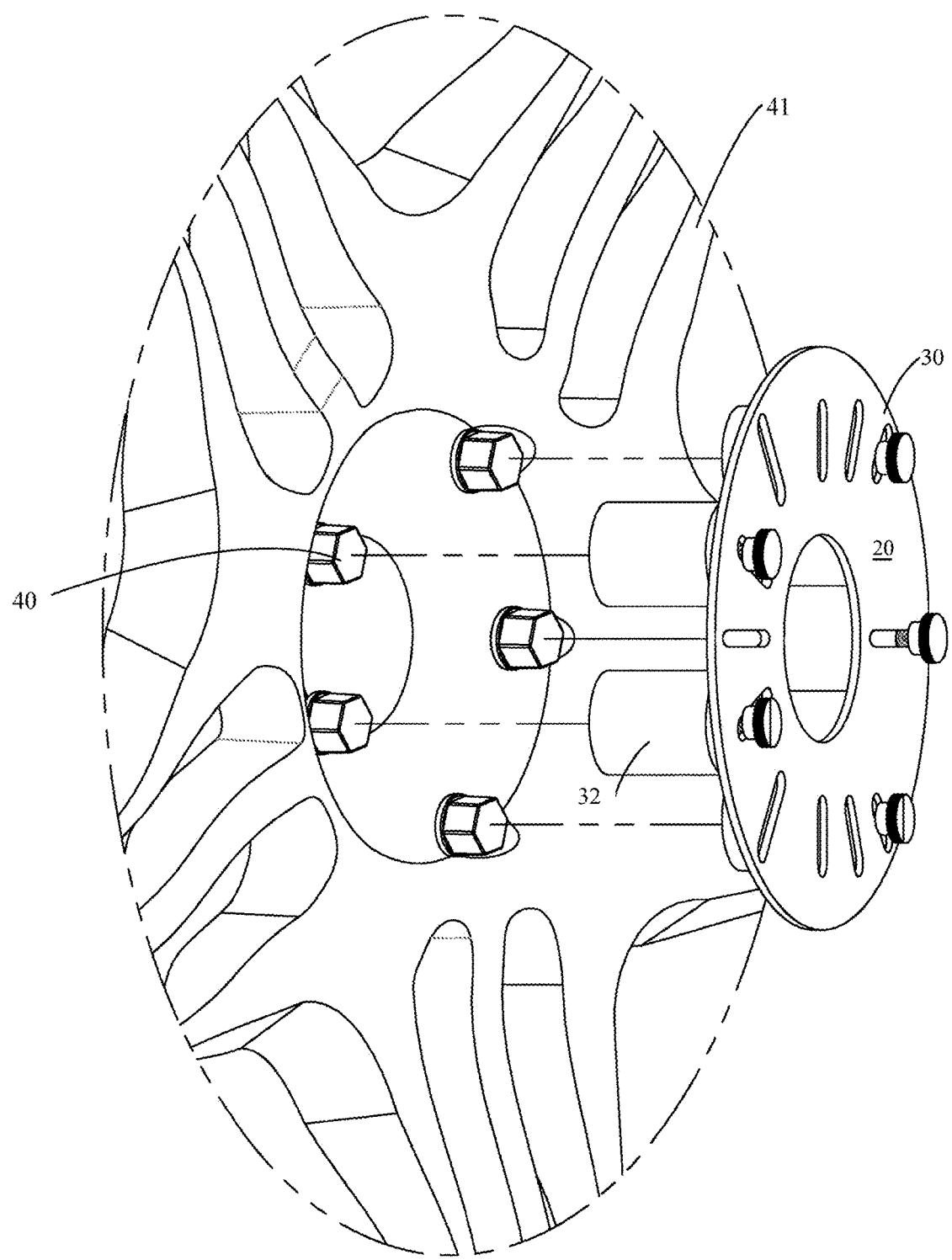
FIG. 4 shows the prior art mounting apparatus removably attached to a wheel.

For such a system to be removeable, it must include removably attached sensors. One such removable sensor, pertaining to the vehicle wheel, is the device presented in U.S. Pat. No. 11,480,491 (Canfield et al.) from Balanced Engineering, LLC, which is incorporated by reference herein. The device described therein allows sensors to be removably attached to the lugs of a passenger car wheel. The mounting apparatus of the device from Canfield et al. is shown in FIG. 3 for ease of reference. The mounting apparatus 20 consists of a disk 30 and multiple cup shaped attachments 32. FIG. 4 shows how the mounting apparatus 20 mounts to the lugs 40 of a 5-lug wheel hub 41.

Figure 5:
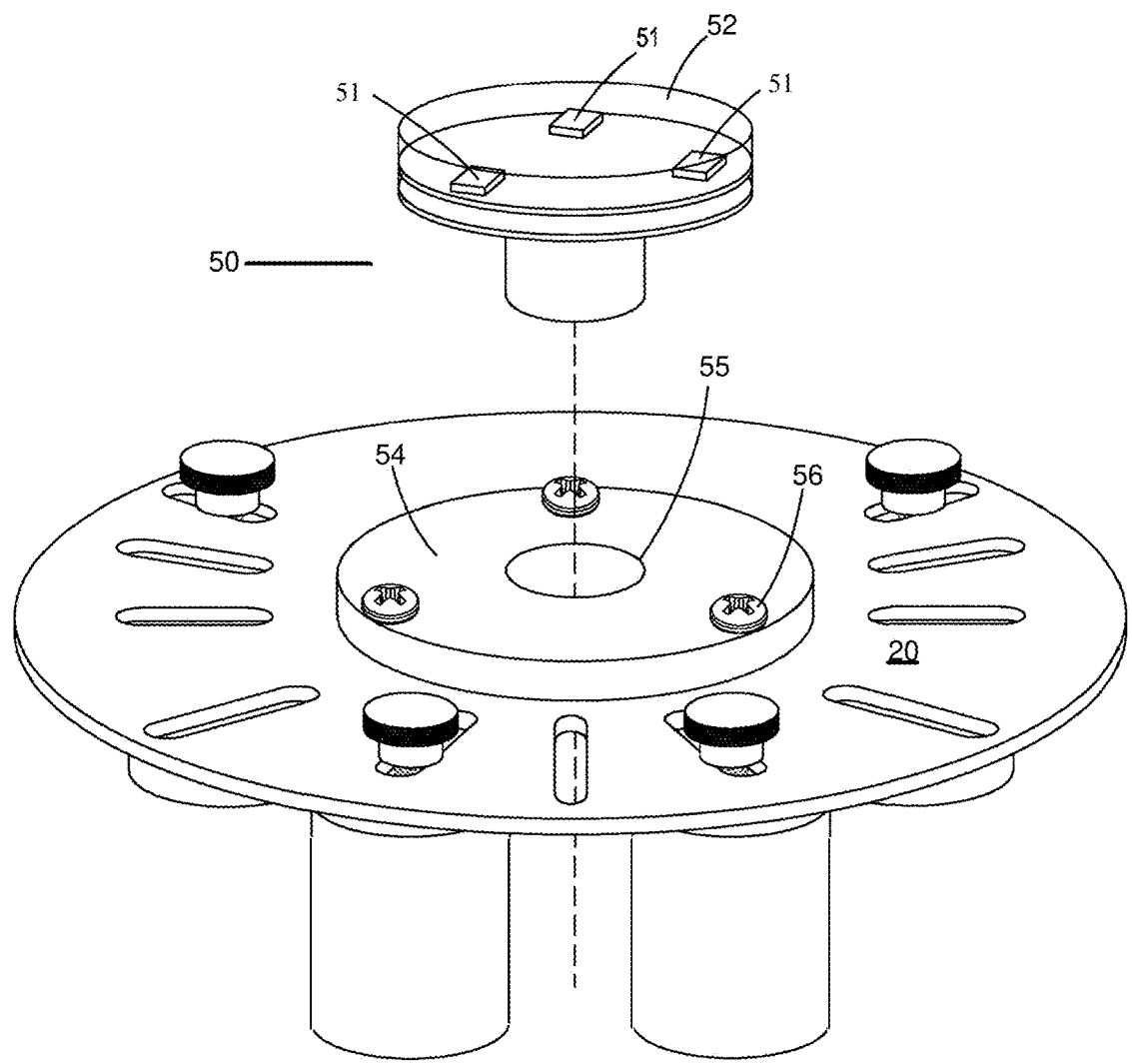
FIG. 5 shows one embodiment of a prior art removably attached sensor consisting of multiple inertial measurement units (IMUs).

The device from Canfield et al combines the attachment apparatus shown in FIG. 3 and FIG. 4 with multiple inertial measurement units (IMUs) and is shown in FIG. 5. The embodiment of the apparatus 50 has the addition of three IMU's 51, mounted on an IMU holder 52 and attached to the mounting apparatus 20 through a mounting plate 54 with an aligning shaft 55 and attached with screws 56. The IMUs are arranged in an equilateral triangle configuration, wherein each IMU is equidistant from the center of the mounting holder 52 such that the relative positions of the IMU's are known.

Further developments by NVH Technology LLC, formerly Balanced Engineering Solution, have progressed the apparatus of U.S. Pat. No. 10,969,292 (Canfield et al.), which is incorporated by reference herein, to the device 1 shown in FIGS. 6A and 6B wherein the mounting apparatus 20 from FIG. 5 was redesigned and aerodynamically sized into a star pattern 11 with similar mounting cups 61 secured by screws 12 that mirrors the lug pattern of the desired hub. Other embodiments would naturally increase the star pattern to match other lug patterns such as 6-lug and 8-lug hubs for example.

The IMUs within the device can be used to quickly diagnose wheel anomalies during operation of the car, which was previously difficult due to the need for tethered sensors on a rotating body.

Figure 6A:
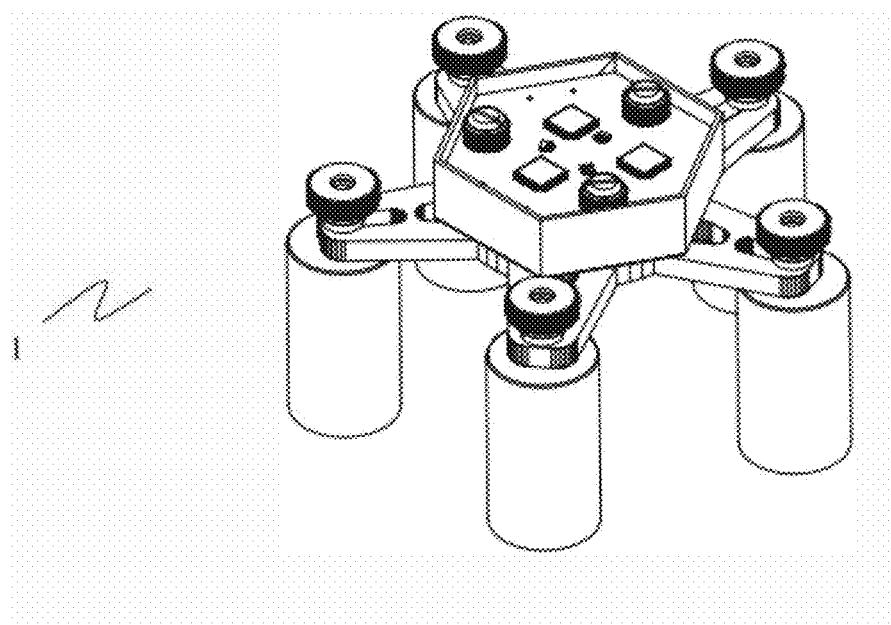
FIG. 6A shows one embodiment of a removably attached sensor consisting of three IMUs.
Figure 6B:
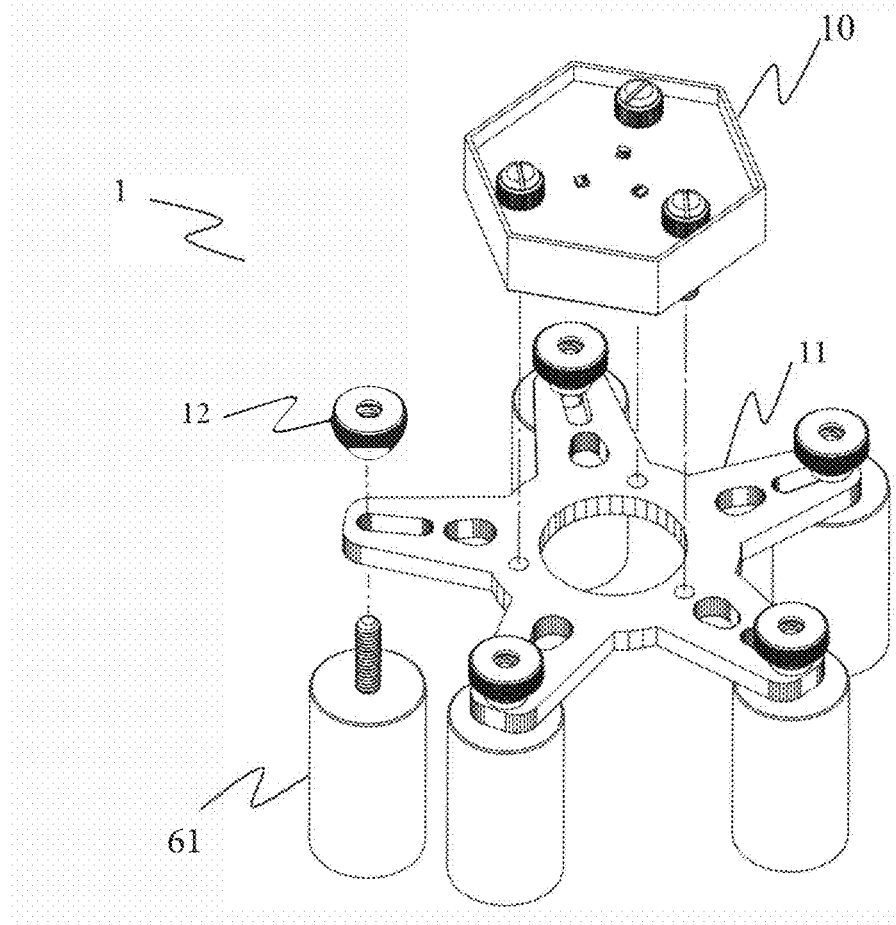
FIG. 6B shows an exploded view of the embodiment of a removably attached sensor with three IMUs.

The device 1 shown in FIG. 6A is specific for rotating bodies, such as the wheel assembly, due to the inclusion of three IMU sensors for rotational triangulation of anomalies. However, they could be included in a more complex system that included other sensors and devices to diagnose components other than those of the particular wheel to which they are attached. One would only need to replace the lug mounting apparatus with a different mounting apparatus specific to the desired rotating body of focus.

It is understood that additional types of removable wireless sensors not specifically identified herein could be adaptively deployed as part of the system. For instance, OBD plugin diagnostic modules which have Bluetooth connectivity options or the like may be incorporated into the system.

2.4. Single Sensor and Expansion

Figure 7:
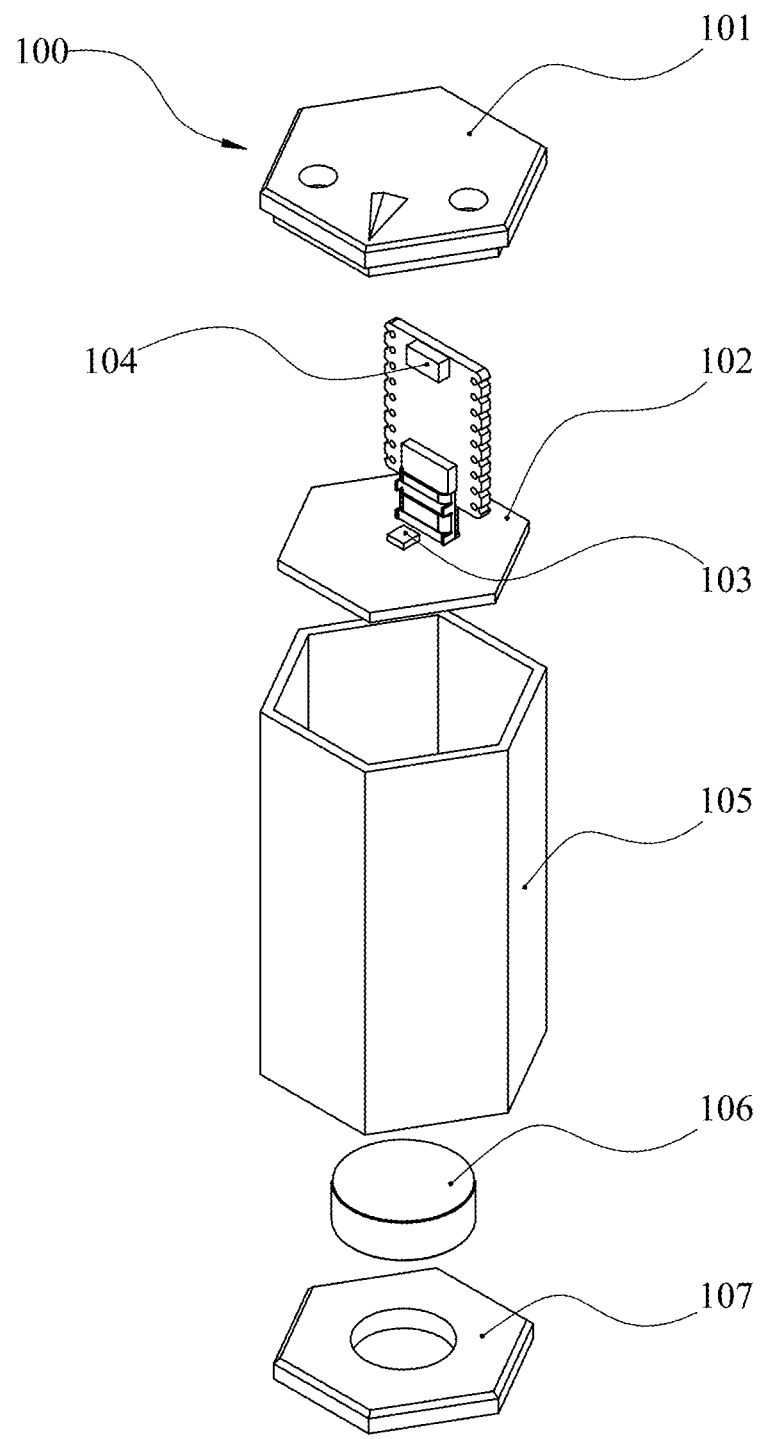
FIG. 7 show an exploded view of an embodiment of a removably attached sensor with a single IMU.
Figure 8A:
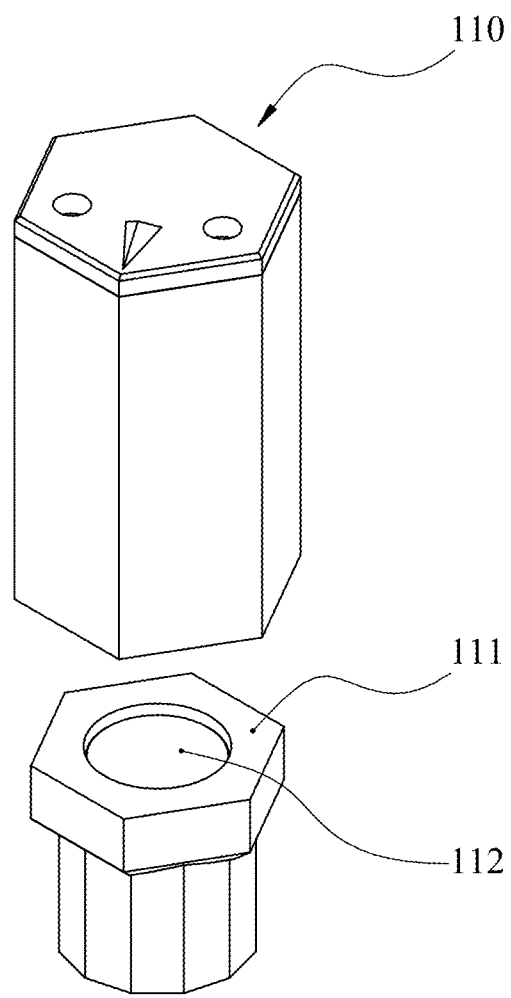
FIG. 8A shows one embodiment for attaching the single IMU sensor device to the lug of a wheel hub.
Figure 8B:
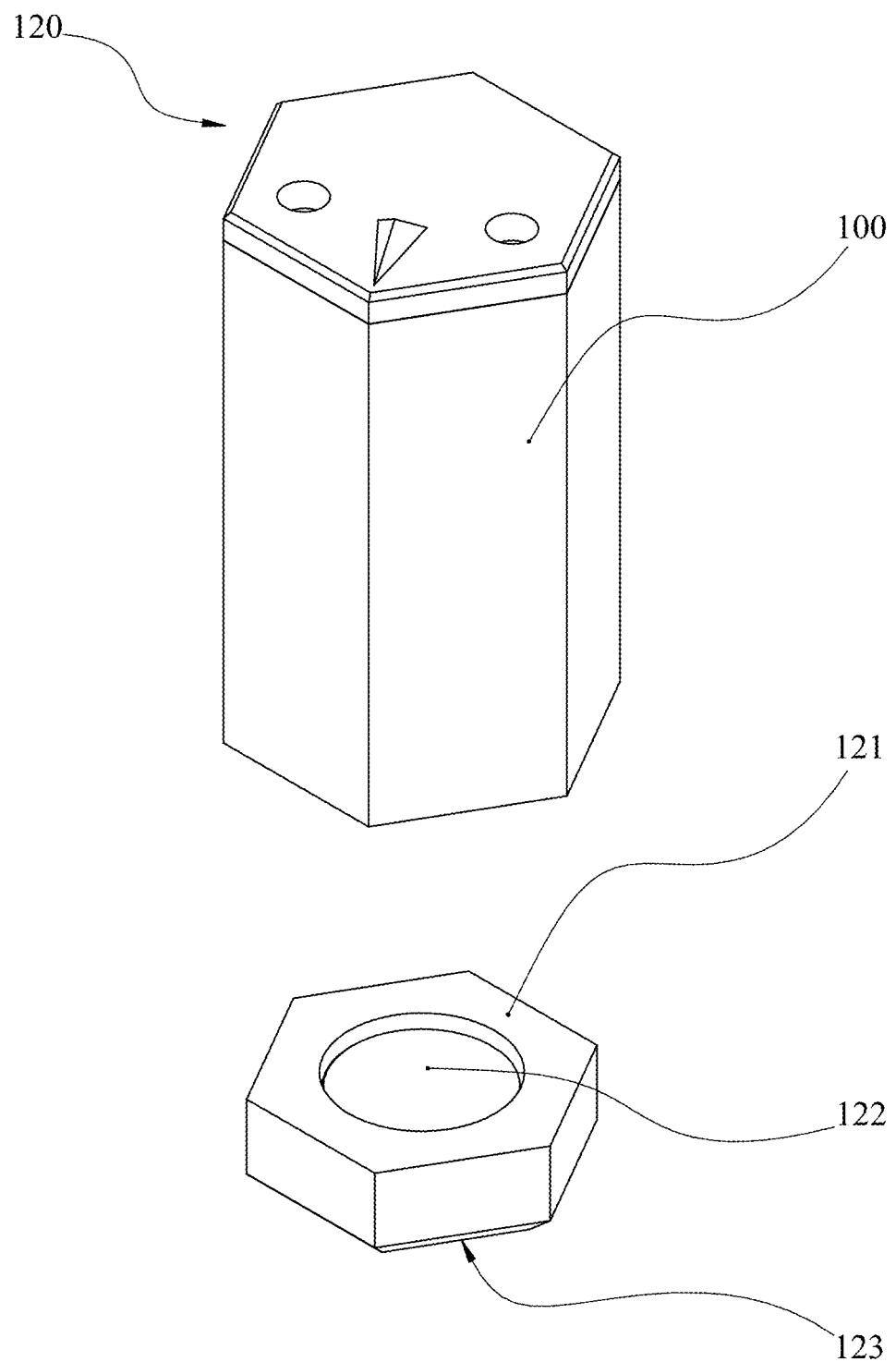
FIG. 8B shows one embodiment for attaching the single IMU sensor device to the body of a vehicle.

Recently, developments with the NVH Technology LLC device have led to the separation of the three IMU's within a single device to three distinct and separate individual devices, as described in U.S. Pat. No. 12,181,368 (Buchanan et al.), which is incorporated by reference herein. By distilling the device down to a single IMU, it has kept its diagnostic capabilities while increasing its adaptability. The single sensor device 100 is shown in FIG. 7 and includes a lid 101, printed circuit board (PCB) 102, IMU 103, antenna 104, enclosure 105, and attachment magnet 106 with retaining ring 107. One embodiment of the antenna 104 is an RF antenna. The novelty of this device is in the module mounting interface, with one embodiment shown in FIG. 8A as the lug cup attachment 111 and coupling attachment magnet 112. This allows the single device to be attached to the lugs of a wheel similar to the previous device 1 in FIG. 6A. The module mounting interface, through the use of the attachment magnet 112, allows for the single sensor device 100 to quick-change its mounting attachment to wherever the system needs it, such as a wheel or ferrous component. One such additional attachment is shown in FIG. 8B wherein a single sensor body mounting device 120 is comprised of the single sensor device 100, a body attachment 121, and attachment magnet 122. The mounting face 123 allows for mounting anywhere on a vehicle body through various methods such as adhesive and magnets.

Figure 9A:
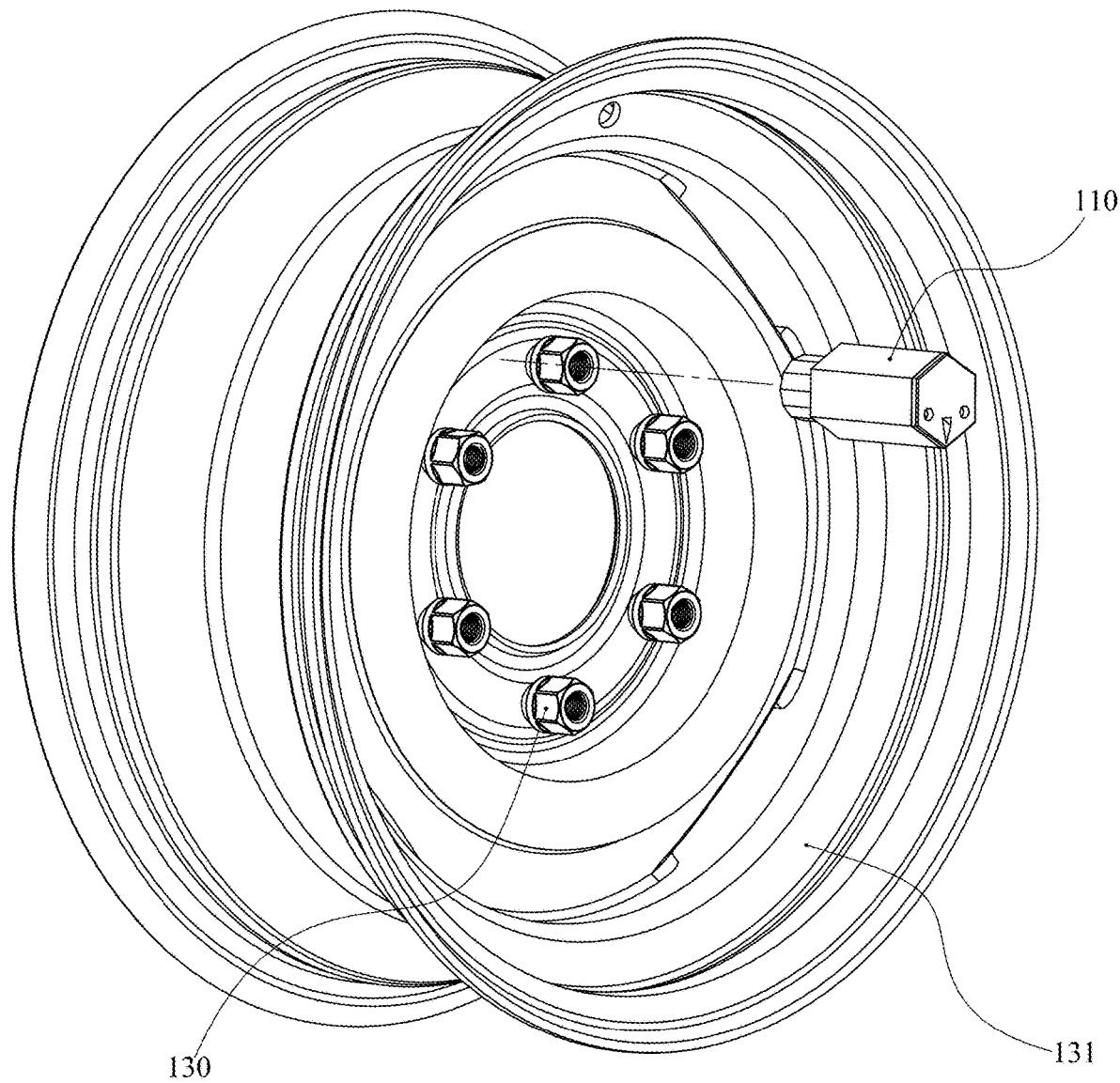
FIG. 9A shows one embodiment of the single IMU device attached to the lugs of a wheel hub.
Figure 9B:
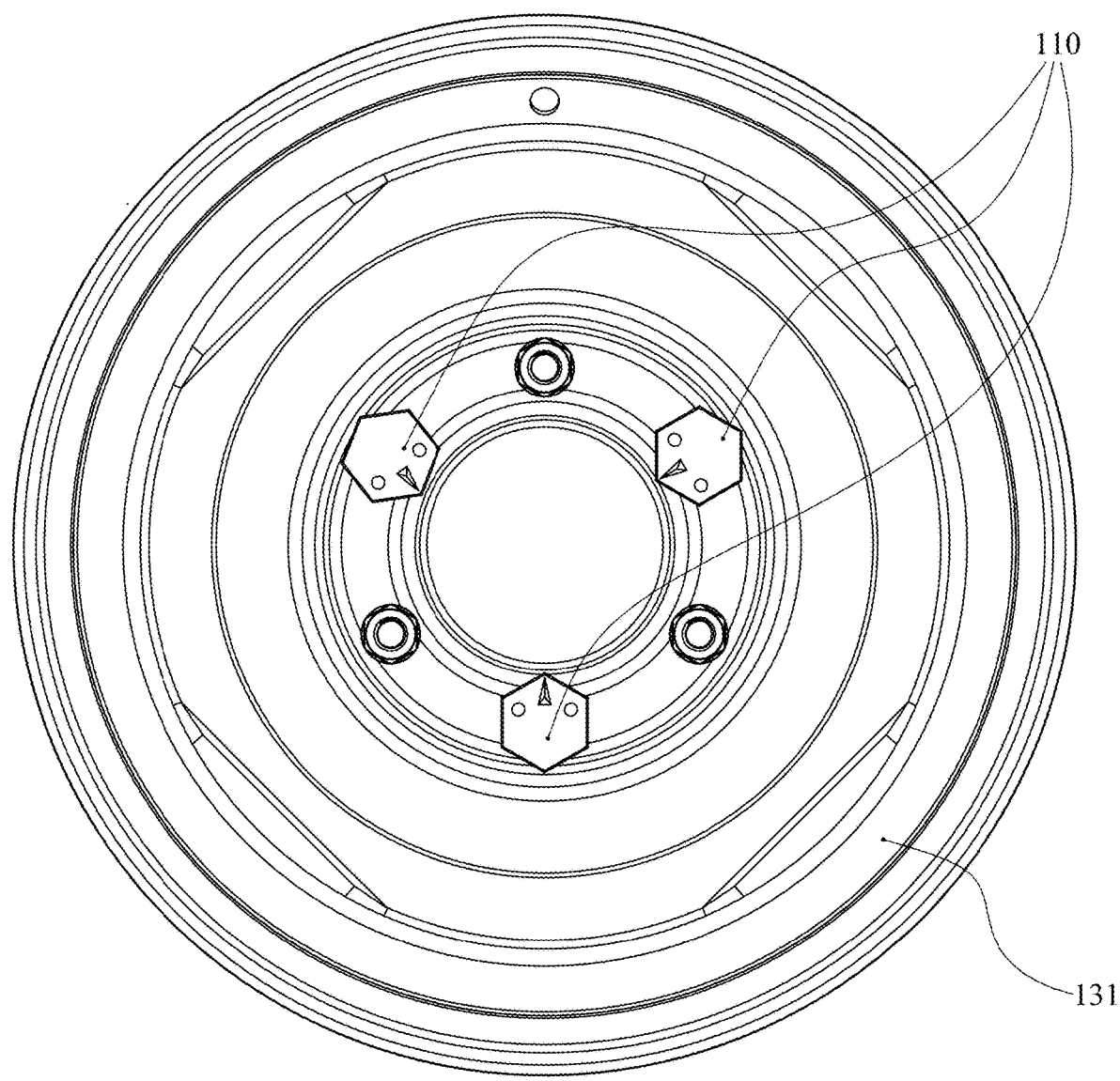
FIG. 9B shows an embodiment of multiple single IMU devices attached to multiple lugs of a wheel hub.

To produce the same anomaly triangulation capabilities as the device 50 in U.S. Pat. No. 10,969,292 (Canfield et al.), at least three devices are mounted to individual lugs, spaced as evenly as possible. This is shown in FIG. 9A, with a single sensor device 110 attached to a lug 130 of a 6-lug rim 131, and in FIG. 9B with three devices 110 as described. The added capability of modular mounting attachments and compact design allows this single device to be mounted anywhere on the vehicle, wherever the technician desires to perform vibrational diagnostics.

2.5. Multiple Sensors

Figure 10:
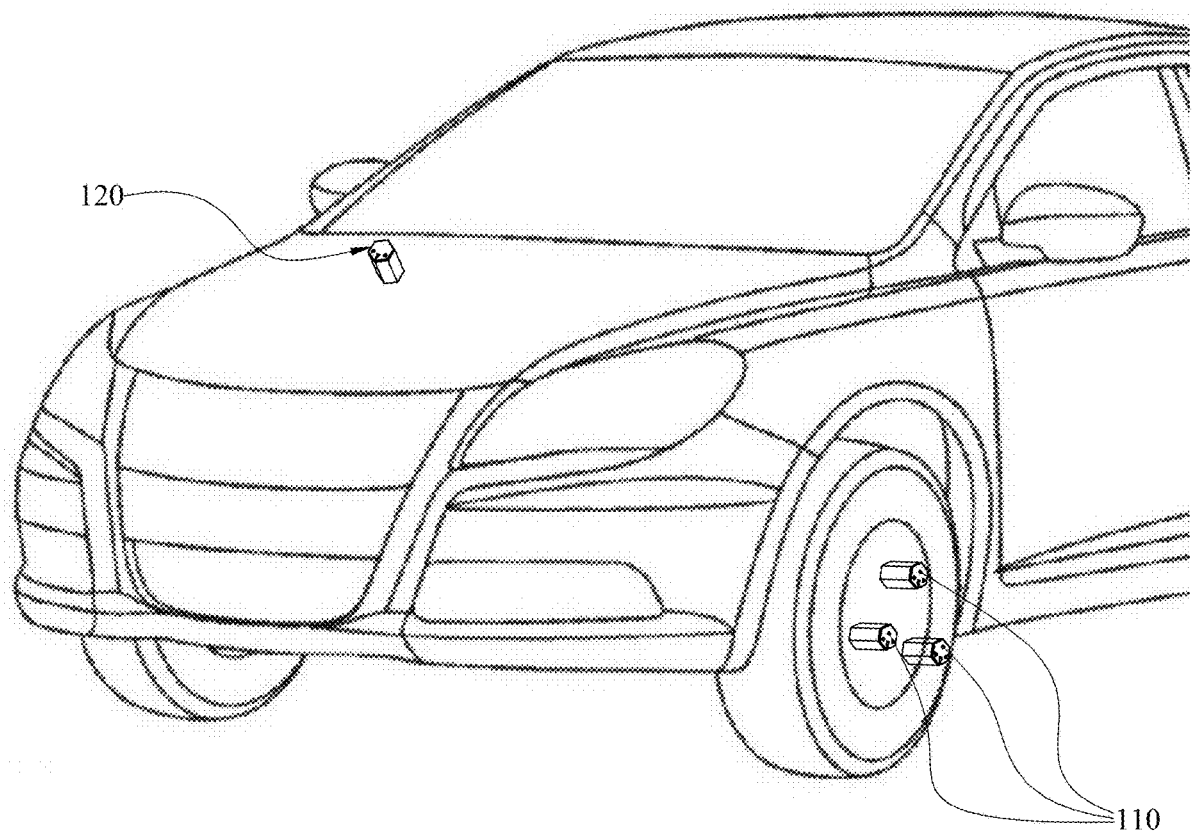
FIG. 10 shows an embodiment of the removably attached diagnostic system comprising multiple embodiments of the single IMU sensor device.

With the use of the above-mentioned IMU sensor in U.S. Pat. No. 12,181,368, full vehicle vibrational diagnostics can be performed. One embodiment is shown in FIG. 10 with the use of the single IMU device 100 from FIG. 7 attached to multiple locations of the vehicle with the help of its variety of adaptable attachments, including the lug attachment embodiment 110 and the body attachment embodiment 120. With the implementation of a plurality of such removable sensors, communication and retrieval of data truly defines how usable such a system is with a large number of sensors, potentially making it more robust for full scale diagnostics or for applications to larger vehicles.

3. Communication

The current invention uses remote collection devices that are removably attached to specific areas or components of the vehicle. "Remote collection" refers to systems that collect data at the site of the sensor system, saving the data collection by either "embedded storage" or "onboard storage", which can then either be visually displayed on the sensor to the user, or transferred after use to a system located off the vehicle for analysis. This is different from "tethered" or "integrated" sensors. "Tethered" sensors are those which are connected by some method other than wireless, or tethered to a separate computer system for data collection, and "integrated" sensors are those connected to the vehicle's onboard computer system. Remote data collection allows for the sensors to be placed in complex locations or in locations where conventional tethered sensors are inaccessible.

Using one or more communication standards including, but not limited to, Bluetooth®, Wi-Fix, NFC, radio, optical, acoustic, or similar, and post-calibration of start-times (in the case of more than one sensor) over a given (set) of communication standard(s), data collected amongst one or more sensors can be offloaded from the vehicle to the communication device(s) and analyzed by on- or off-premises devices or servers.

4. Anomaly Recognition

With communication between the sensor system(s) and analysis device(s) established, the system is physically adaptable. All that remains for the technicians to do is to select which components, or subsystems of the vehicle, they wish to analyze/diagnose.

4.1. Component Selection

The presented system operates by selecting vehicle components of interest, whether they be high maintenance components, components of high importance, or components in a central area that may pick up anomalies from a variety of other components. For example, a wheel is a high maintenance component due to its constant high cycling motion, the engine is a component of high importance, and the cabin or drive seat is a component in a central area that picks up anomalies from multiple other components.

As the present system relies on a database-driven model for each vehicle component where the database is populated by known anomalies, only those components with identified anomalies can be used for pure diagnosis. However, as the models are driven by a database, the addition of other identified anomalies and the creation of new databases for new components is always possible.

4.2. Anomaly Analyzing

4.2.1. Full System Analyzer

Figure 11:
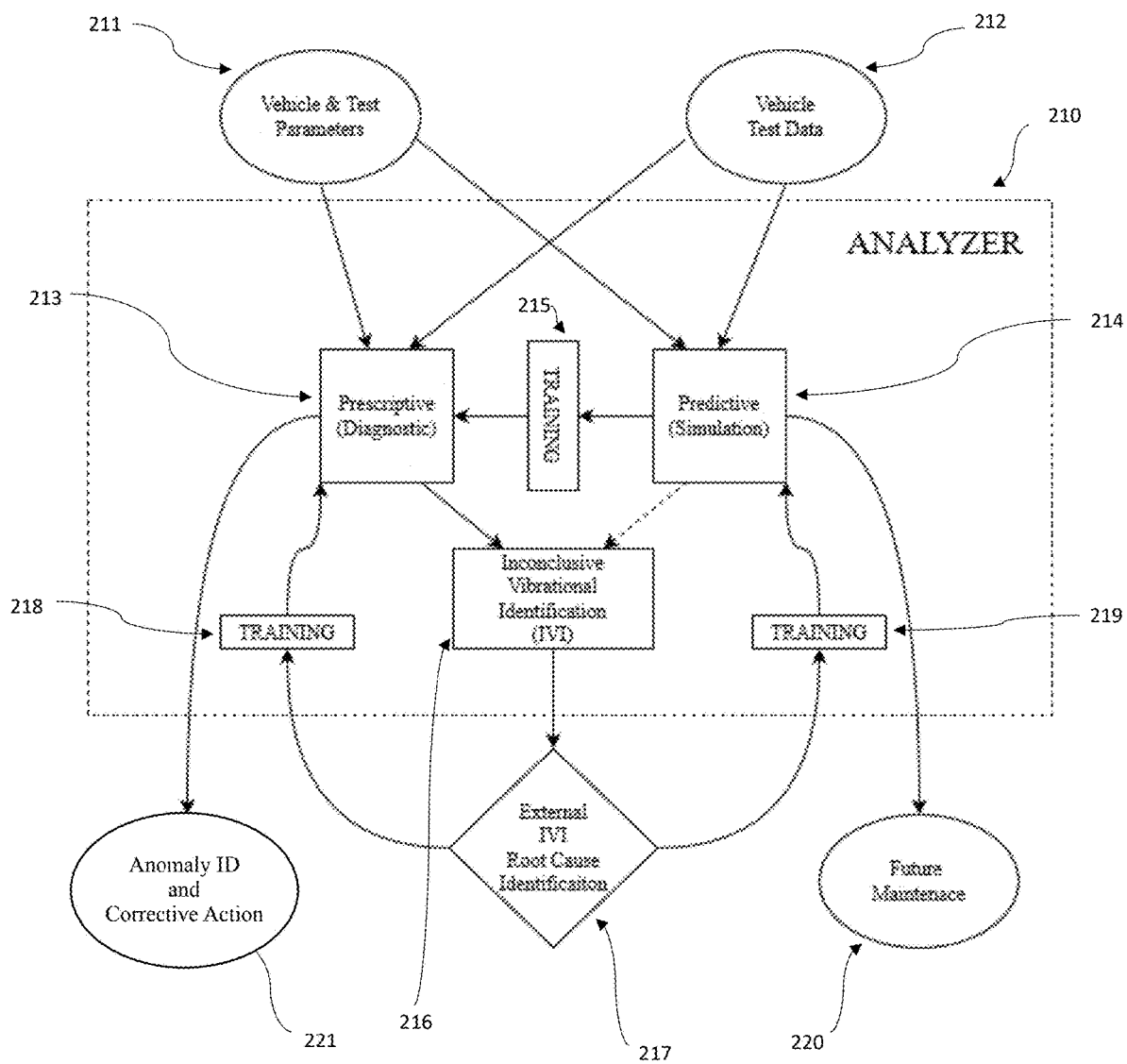
FIG. 11 is a flowchart describing the general overview of the analyzer for vehicle anomalies.

To perform full vehicle diagnostics, the individual component models, representing the selected components of interest within the system, can be combined to form what is herein termed the "Analyzer," interchangeably refired to herein as an "AI model." FIG. 11 shows one embodiment of analyzer 210 which includes two main elements, a prescriptive element 213 and a predictive element 214. The analyzer 210 takes in vehicle parameter data 211, such as vehicle model, tire make and model, namely, all of the parameters that would normally be acquired by a shop technician when a vehicle would be taken in for maintenance. The analyzer 210 then takes in test data 212. Test data 212 refers to sensor-collected data of the vehicle during operation.

The parameters 211 and test data 212 are then given to both the prescriptive element 213 and the predictive element 214. The prescriptive element 213 performs the diagnostic and generates the identification of the anomaly's root cause and the associated corrective action suggested 221. The predictive element 214 generates simulated data using the parameters 211 and test data 212 which are then used to help train 215 the prescriptive element 213. It can also be used to simulate the anomaly over time to determine if future maintenance 220 should be scheduled.

Figure 12:
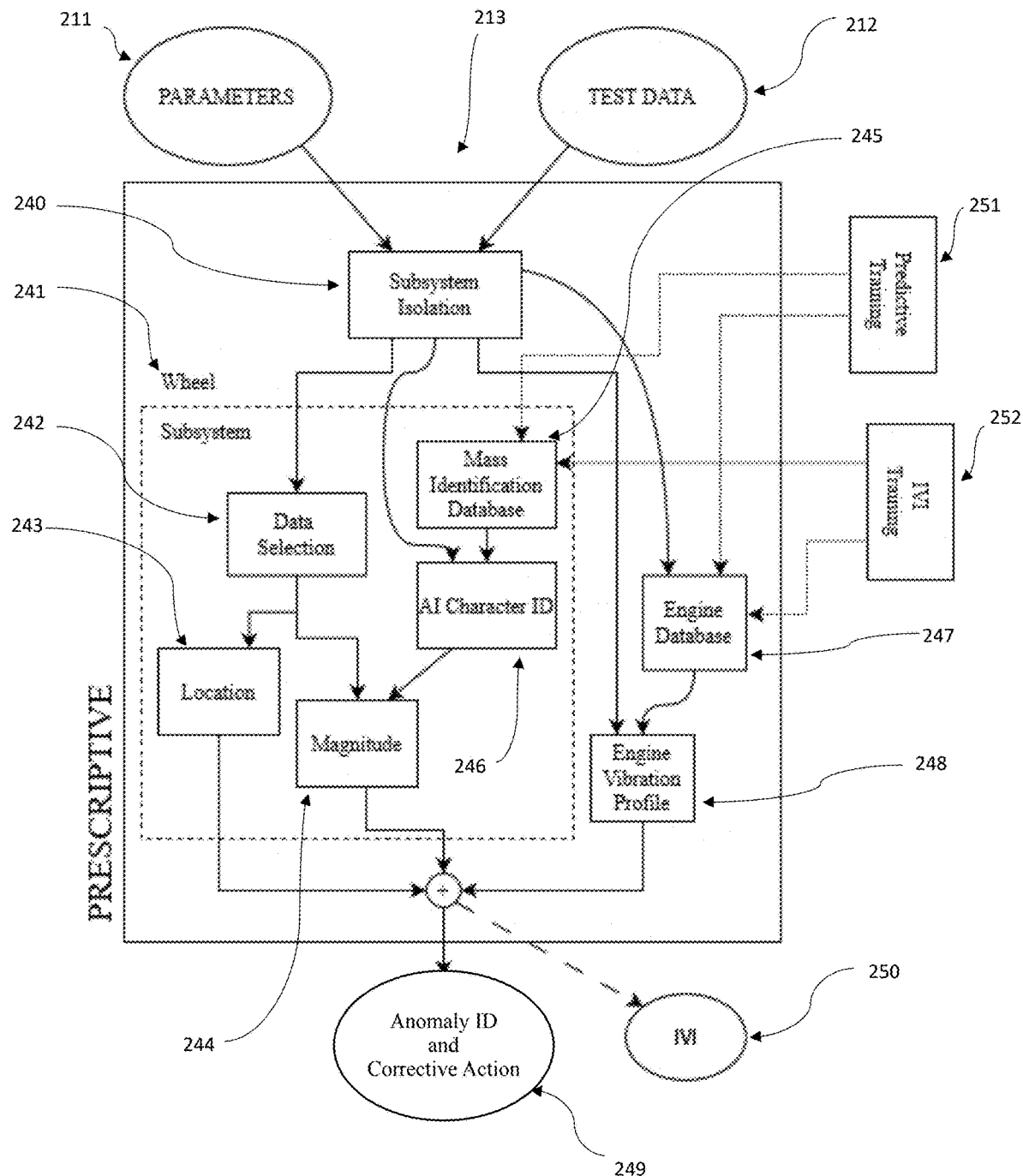
FIG. 12 is a flowchart describing the prescriptive element of the analyzer.

The embodiment of the prescriptive element 213 from FIG. 11 is further discussed in FIG. 12. The Prescriptive Element 213 requires the vehicle parameters 211 and vehicle test data 212 which are passed to Subsystem Isolation 240 for processing. Subsystem Isolation 240 separates relevant sensor data, such as all of the sensors on a specific wheel, from the full system data as provided by test data 212. Subsystem Isolation 240 is required because there may be multiple sensors that are used in conjunction to determine anomalies of a single component, or closely related components. Subsystem Isolation 240 can be performed by many methods. The most direct and basic form of such isolation is the simple tagging of each sensor and identifying what component/family of components each sensor is tasked with, and including the tags within the parameters 211. Other methods include combining sensor data on known components to remove those component vibrational profiles from other components. Combining or excluding the engine sensors and the wheel sensors to remove wheel vibrations from the engine reading, or vice-versa, as just one of many possible examples.

4.2.2. Individual Component Models

Once subsystems are isolated, their relative data can be analyzed for subsystem anomalies using aforementioned individual component models. In the embodiment shown in FIG. 12, the system's prescriptive element 213 consists of only a wheel subsystem 241 and an engine component 248. In this case, the diagnostic system has been more narrowly focused and is only looking for wheel and engine anomalies. This is one embodiment and is in no way restricting the present invention to the shown example subsystems. The wheel subsystem identifies wheel anomalies, such as imbalance, radial force variation, and eccentricity. The subsystem's raw data are then passed to Data Selection 242 which processes the data and finds the optimal section needed to determine anomaly corrections.

4.2.2.1. Anomaly Identification and Location

Current analysis can best be presented using the device described in U.S. Pat. No. 11,480,491, a removably attached device containing multiple IMU's (a modified version of which is shown in FIG. 6A). This device uses IMU data to identify anomalies.

By incorporating three IMU's rotating with the wheel/rotating body, the centripetal acceleration read by the IMUs is able to pinpoint the center of rotation (COR) of the wheel/body. As most mass displacement vibrations cause a shift in the center of rotation, mapping the shift of the center of rotation from the rotating shaft to the displaced center of mass allows for both the identification of an anomaly as well as its location. The location of the center of rotation can be determined using a triangulation method, such as the one mentioned in U.S. Pat. No. 11,988,573. This triangulation method allows for application of vector math from three sensors to find the center of rotation.

Figure 13:
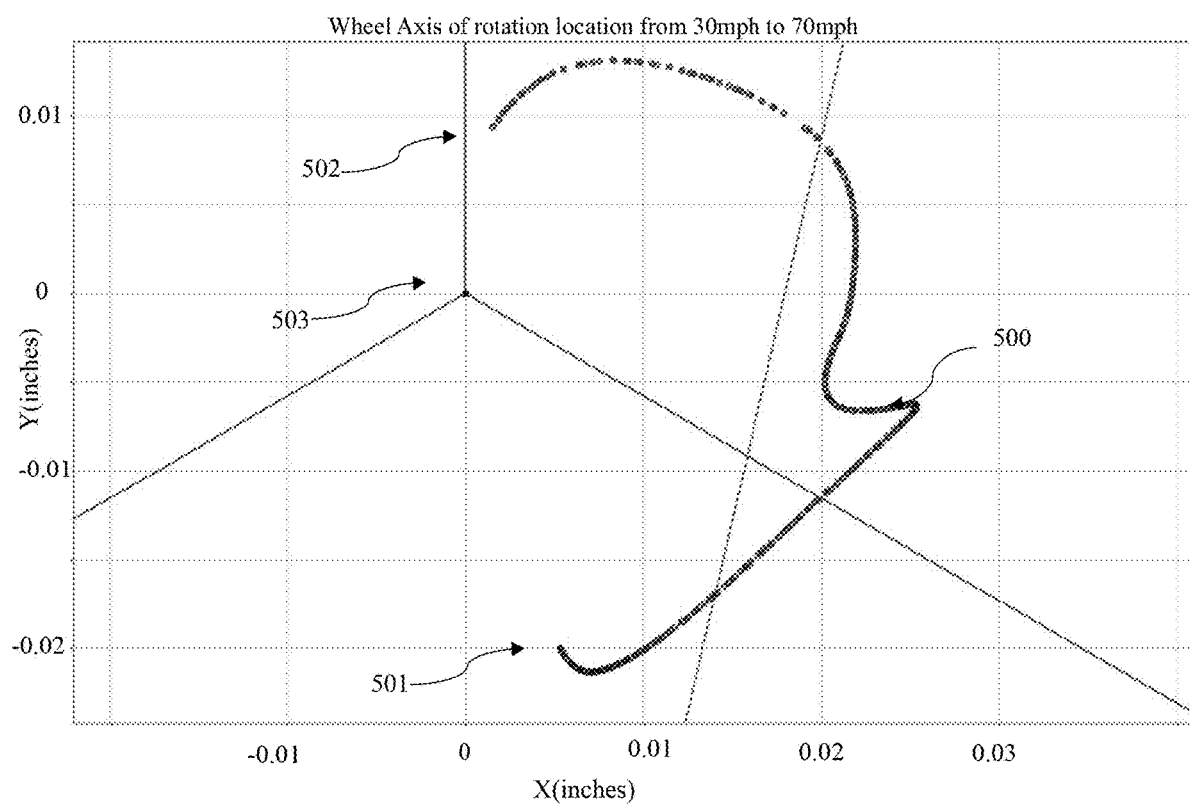
FIG. 13 is a graph showing the movement of the center of rotation during vehicle operation.

FIG. 13 is a graph showing the representation of one embodiment of a vibration profile, the movement of the center of rotation of an on-car rotating wheel while the vehicle is slowly accelerating. Each point on the graph, 500, is a center of rotation averaged over one rotation of the wheel at a specific speed. FIG. 13 shows the center of rotation from 30 MPH, 501, to 70 MPH, 502, showing the mapping of the COR from speeds close to the bearing center to those past the resonance of the natural frequency. The grid, 503, shows the device center. This graph also shows how the slight deviation of the device off-center of the bearing is detectible and can be corrected for when needed.

Once the center of rotation is mapped, there are multiple ways of determining the location of the imbalance. Determining the location of the imbalance relies on the magnitude of the imbalance vibrations. One such embodiment relies on vibrational amplitude. As such, locating the natural frequency of the wheel assembly, and representing that frequency as speed, will give a starting place for collecting data. Since the natural frequency is the frequency where the imbalance will resonate the most, and therefore will produce the peak of the imbalance vibrations, analyzing the COR movement in and around resonance will present movement towards the center of mass. It is important to note that due to the nature of vehicle suspension, the drive shaft of a vehicle can be considered a flexible shaft. As such, the suspension system keeps the wheel from ever truly reaching the center of mass but rather allows for movement towards the center of mass.

The natural frequency of a vehicle's wheel and suspension system is not known to be in the consumer product market but rather is usually determined experimentally in labs. This is due to the complexities of getting the actual parameters of the system needed for the natural frequency model, such as a quarter car model. While most vehicle designs set the suspension parameters and then build the vehicle, as vehicles are built to ride quality standards, a method for determining the vehicle parameters after design is needed. As such, a VIN-based Natural Frequency Estimator has been developed which takes the vehicle information in the Vehicle Identification Number (VIN), which includes weight and other necessary parameters, and calculates the natural frequency of the vehicle. This calculated natural frequency is an estimation as there are a number of assumptions such as there has been no wear in the suspension. Thus, the calculated number is more accurate for new vehicles right from the factory.

The Natural Frequency Estimator generates a starting frequency, and therefore speed, at which peak vibrations due to imbalance should present. By collecting COR mapping around that given speed, multiple methods can be used to determine the COR location, based on the quality of the data.

Figure 14:
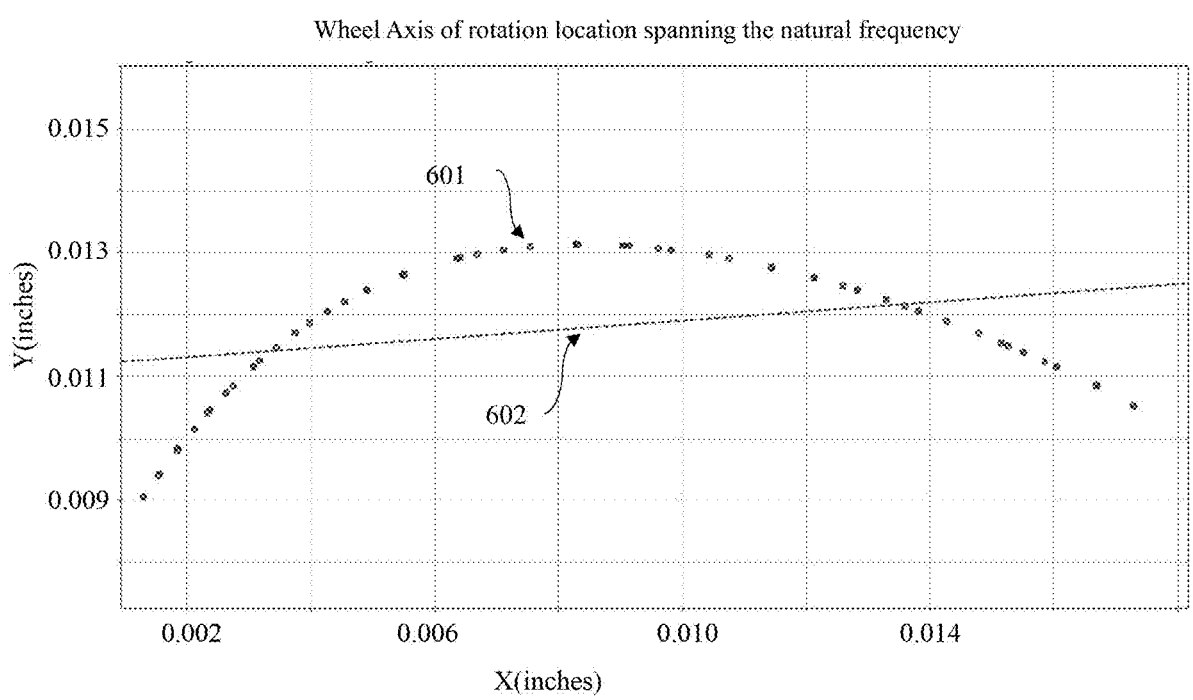
FIG. 14 is a graph showing the movement of the center of rotation as it spans the natural frequency. It is a zoomed-in version of FIG. 13.

One such method is to slowly and consistently accelerate through the natural frequency resonances. As the COR moves most freely towards the center of mass at the natural frequency, within drivable speeds, this mapping through resonance allows for the mapping of the COR as it approaches and then deviates from the center of mass. As this movement is not like a centrifuge, due to the reaction forces of the suspension, it has been found that the COR towards the natural frequency does not directly correlate in a linear fit to the position of the Center of Mass (COM). It has been found that calculating the COR span of the 3 db rolloff before and after the natural frequency better correlates to the location of the COM. A linear fit between the ends of the span then can be used to identify, on the rim of the wheel, where corrective weights should be placed to offset the change in center of mass (COM) experienced by the presence of the anomaly. This can be seen in FIG. 14 where the COR span around the natural frequency 601 can be seen and the linear fit 602 indicating the location on the rim of the imbalance mass, and therefore a corrective weight can be added on the opposite side, is calculated.

Another embodiment for determining the location of mass, or imbalance mass, on a wheel assembly is present in U.S. Pat. No. 11,988,573, which using the center of the bearing, derived at low speeds, and a speed in resonance to map to the location of a mass imbalance.

These two methods are determined based upon vehicle characteristics, such as suspension systems, road quality, driver capabilities. An example to highlight the difference between the two systems is the difference between a sedan and a pickup truck. As the sedan is designed for ride comfort, the suspension characteristics are different which may allow for the use of the straightforward baseline-to-resonance to detect the imbalance. The pickup truck has a front cab designed for ride comfort and a rear bed designed for weight carrying. This leads to drastically different suspension and drive characteristics leading to using a span around the natural frequency to determine the location. The use of an AI database for profile identification, as mentioned above, can be implemented to determine which method should be used for a given data profile.

4.2.2.2. Magnitude of the Mass

Figure 15:
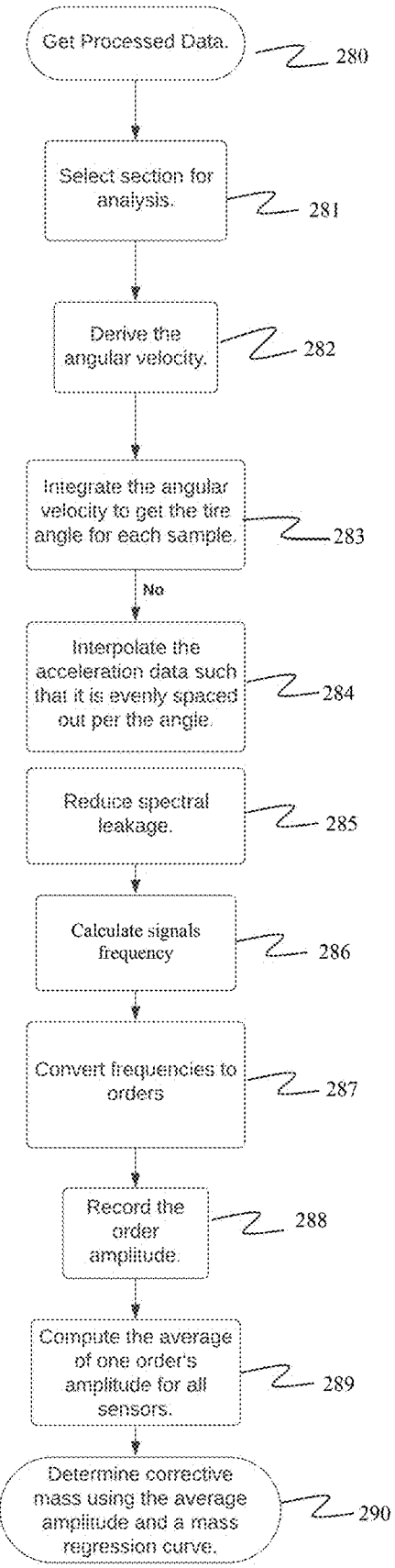
FIG. 15 is a flowchart describing the mass calculation of an anomaly for the wheel.

There are many ways to calculate mass magnitude and its orientation relative to the wheel. In one embodiment, the magnitude of the mass is determined using a predictive model using an order regression. The scope of the presented method is not limited to using order regression, but includes other types of predictive models, such as classification models or neural networks. The regression model is shown in FIG. 15, and the steps and outcomes are as follows:

Block 280: Get processed data. These are data from the IMU sensors that have been scaled from bitcount to acceleration units with aligned axes.

Block 281: Select section for analysis. This is typically a section of data indicated by the trail or within the resonance span of the specific vehicle. This is set by the operator.

Block 282: Derive the angular velocity. This converts data from bitcount to m/s and rotates sensor data to align axes.

Block 283: Integrate the angular velocity as a function of time to get the tire angle for each sample.

Block 284: Interpolate the acceleration data such that it is evenly spaced out per tire angle.

Block 285: Reduce Spectral Leakage. One preferred embodiment uses resampling methods.

Block 286: Calculate the Fast Fourier Transform.

Block 287: Convert frequencies to orders. This gives the order amplitude.

Block 288: Record the order amplitude for that sensor. Repeat Blocks 282 through 288 for the rest of the sensors.

Block 289: Compute the average of one order's amplitude for all sensors.

Figure 16:
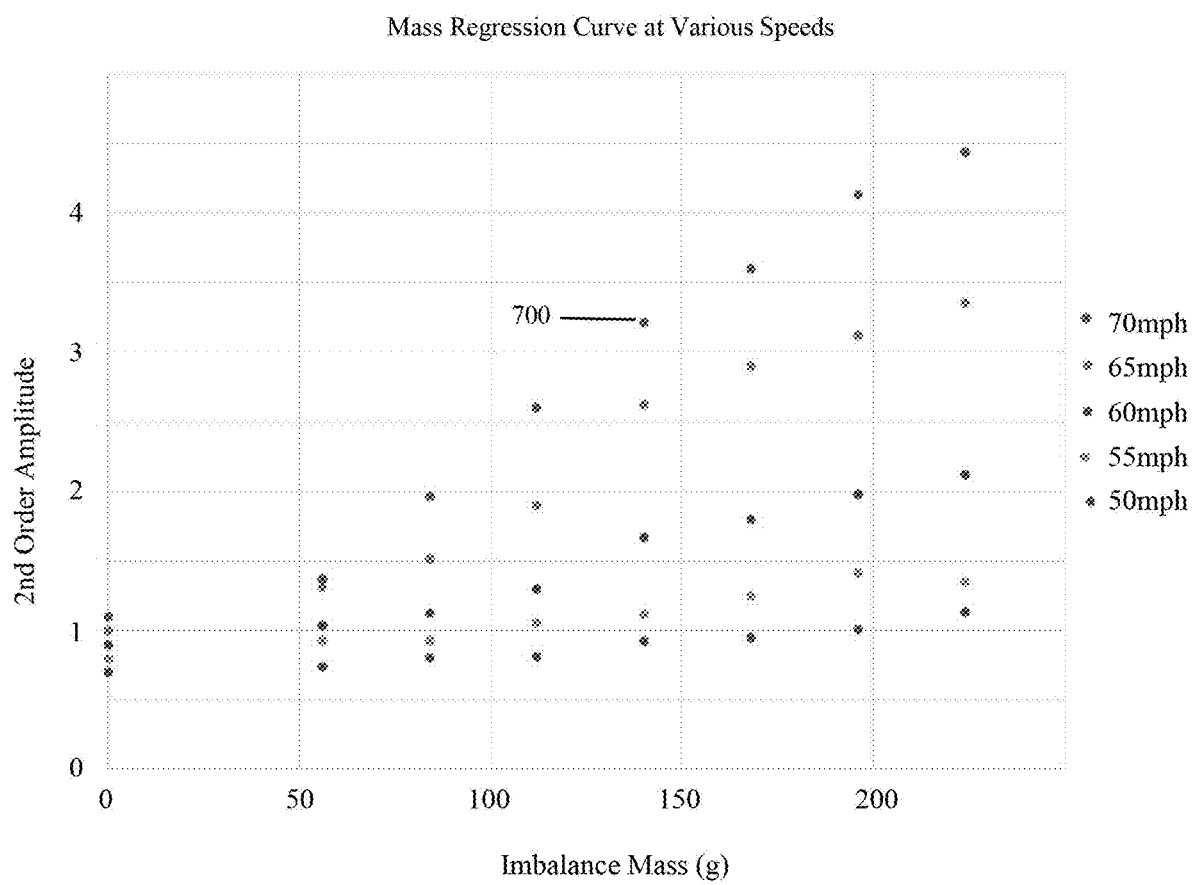
FIG. 16 is a graph showing an embodiment of a mass regression curve.

Block 290: Determine the corrective mass using the average order amplitude and a mass regression curve. The mass regression is a relationship between those factors that are most influential toward the vibration of the wheel assembly and an embodiment. Those factors may include tire mass, rim radius, weight over the axle, and other factors. This regressive curve is an AI-driven function calculated by feeding the vehicle parameters 211 into an AI character Identification model 246, shown in FIG. 12, that generates the ideal regressive curve for the specific vehicle from a mass Identification Database 245 populated with vibration profiles of known vehicles. One embodiment of these regressive curves is shown in FIG. 16 which shows a graph of mass regression created at multiple speeds 700 which also shows how speed is a parameter that influences wheel vibrations. A representation of the database that holds the vibrational profiles of subsystems or components, such as the mass regression in FIG. 16 and the COR trend of FIG. 13, can be seen in FIG. 17.

Regarding FIG. 16, the dots, if connected together from the lower lefthand side to the upper righthand side, would form a succession of non-overlapping spaced lines wherein each line represents a different speed. The topmost line would represent 70 mph and the bottommost line would represent 50 mph.

Identifying the location on the rim to place the corrective weight and the magnitude of the corrective weight will provide the technician with the actions needed to correct a wheel subsystem vibrational anomaly.

4.2.3. Multi Axis Usage for IMU

Due to the 3-axes of the IMU, other non-balancing anomalies can be detected. With the help of 3D mapping using all three axes of the three sensors, anomalies such as wheel wobble as well as rotor blade performance can be identified: wobbling will appear as an oscillation in the z-plane, and rotor blade anomalies will appear as out-of-plane movements in the z-plane. It is understood herein that the term IMU is not limited to accelerometers, but may also include gyroscopes, magnetometers, and the like. More generically, the IMUs may simply be any suitable type of motion measurement sensors.

4.2.4. Inconclusive Results

Another outcome of the FIG. 11 Analyzer 210 is the possibility of an inconclusive vibrational identification 216, that is, an anomaly that cannot be specifically identified or isolated by any of the models within the analyzer. This requires an external identification 217, such as a technician manually identifying the issue. The issue is then fed back into the analyzer by training 218 the prescriptive element 213 and training 219 the predictive element 214. This allows the analyzer to be updated with new anomalies and new components, if say, the anomaly was due to a component that was not in the database of the current analyzer.

4.2.5. Predictive Element

Referring again to FIG. 11, as the prescriptive element 213 has been defined above, the predictive, or simulated, element 214 is presented below.

The simulated elements make use of industry standard vehicle dynamic models that are combined to form a dynamic vehicle simulator which can generate simulated operational data based on operational parameters. This can be used to generate trainable data for the AI models and for simulating possible anomalies.

Figure 18:
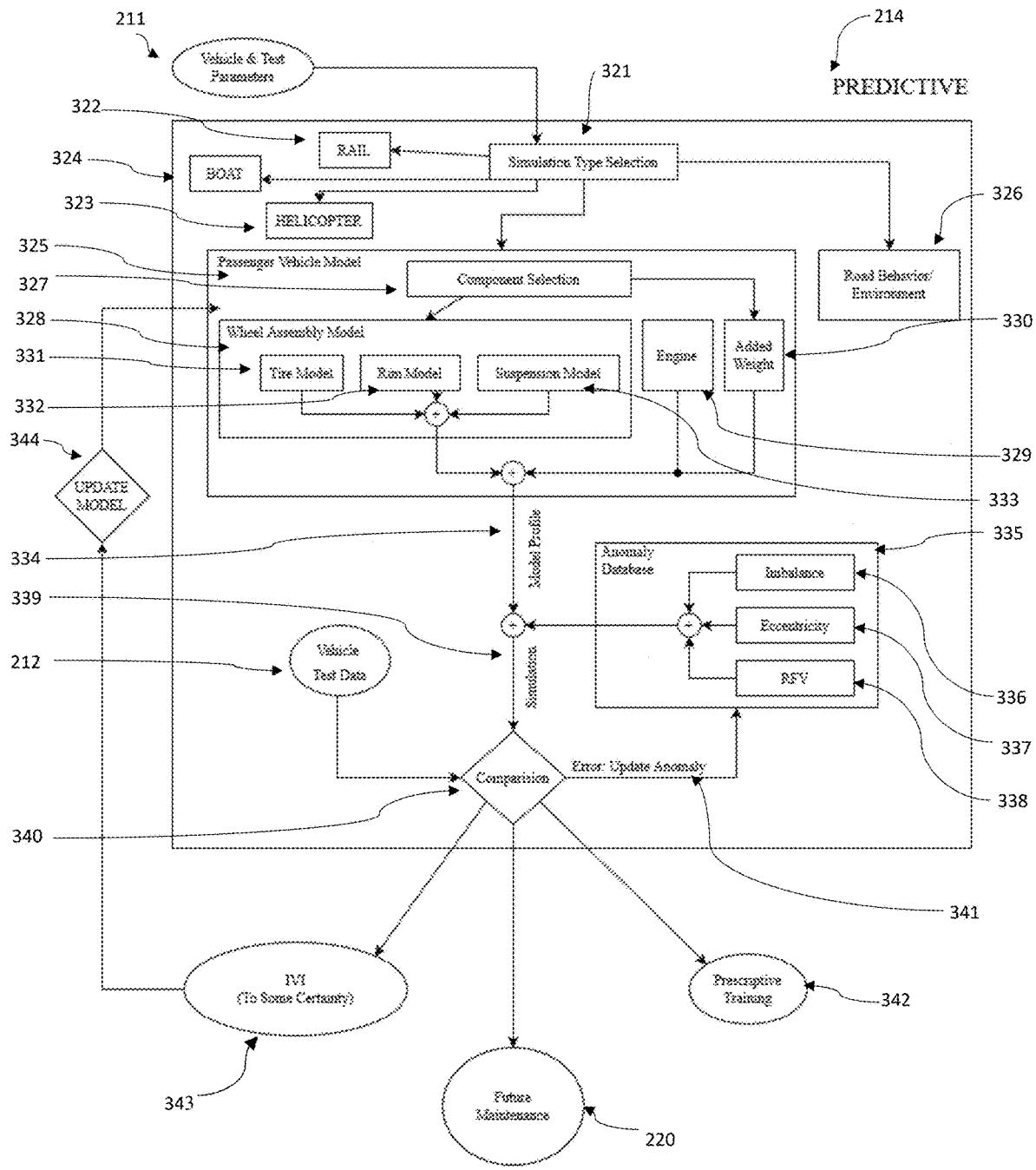
FIG. 18 is a flowchart of the predictive element of the analyzer.

The Predictive Element 214 is shown in FIG. 18. The Predictive Element 214 takes in the vehicle parameters 211. One element of the parameters 211 is the type of vehicle to be simulated. As such, the first step of the predictive element 214 is a simulation type selection 321 wherein the vehicle type and relevant elements are selected. While the example embodiment shown in FIG. 10 is that of a passenger car vehicle, the Simulation Type Selection 321 would also be able to select other vehicle types such as railcar 322, aircraft 323, or seacraft 324. Each vehicle type would have their own Vehicle Model similar to the Passenger Vehicle Model 325 shown. The Simulation Type Selection 321 would also select the environment of testing, for example, whether to include Road Behavior or Environmental conditions 326.

With the selection of a Passenger Vehicle Model 325, the next step of the simulation is Component Selection 327. Component Selection 327 ideally follows that of the Prescriptive element 213 mentioned above, thereby allowing the simulated model to generate comparable data. As such, FIG. 18 shows an example that includes vehicle components including the Wheel Assembly Model 328, Engine 329, and additional weight 330, such as the driver's weight. The Wheel Assembly Model 328 includes dynamic mathematical models of the subcomponents within the wheel assembly, such as Tire Model 331, Rim Model 332, and suspension Model 333. These dynamic mathematical models can be industry known mathematical models. It is important to note that while most dynamic vehicle simulators do not separate the math of such subsystems, that is, a wheel mathematical model would traditionally include suspension equations. By allowing the simulator to separate the subcomponents it is possible to generate isolated component signals and compare individual mathematical models to the collected Test Data 212.

While it is possible to isolate components, to solve a quality-of-ride issues, or simply when looking at the vehicle as a whole system, it is best to combine the subcomponents to produce a combined Wheel Assembly Model 328 vibration profile. Combining the Wheel Assembly profile with the other Vehicle Model 325 components generates a full vehicle Model vibrational profile 334. With the Model vibration profile 334 generated, the simulator is able to add relevant anomalies 335 to the vibration profile to generate ride quality simulated data 339. The anomalies selected for addition are dependent on the Prescriptive Model's AI identification database, that, is to say, known anomalies that can be prescribed, which may include Imbalance 336, Eccentricity 337, and radial force variation (RFV) 338. The addition of new anomalies is possible with the updating of the database with previously unknown anomalies as identified by the Inconclusive Vibrational identification 216 and relevant External identification 217 as described above.

With the added anomalies 335, the Simulated vibration signal 339 is run through a Comparison 340 with the Vehicle Test Data 212. If the signals fall outside the acceptable matching error, the magnitude and number of anomalies are updated 341 until the Predictive Element 214 can create a signal that falls within acceptable limits. If such a profile is generated, it is possible to use it for Future Maintenance 220, as the parameters and anomalies are set, one only needs to verify the time in the signal to generate a future predictive signal. Such a vibration profile can also be used for Training the Prescriptive (Prescriptive Training 342). With a matching signal to real-time in operation data, the addition of simulated anomalies can be used to augment the Prescriptive AI Identification database.

If no acceptable comparison is found between the Vehicle test data 212 and Simulated Profile 339, then it is indicative of an Inconclusive Vibrational Identification 343 which is a result of two possibilities. One is that the anomaly present in the Vehicle Data 212 is not within the scope of the Anomaly database 335. This requires External Identification 217, as discussed from FIG. 11, which would be used to update the Anomaly database 335 in the Predictive. The other possibility is that the dynamic models used for the components within the Simulated Data are inadequate and require updating 344.

This predictive element 214 not only has the capacity to train the AI database with in-operation trained simulated data, but also has the possibility of providing scheduled future maintenance, as well as producing real-time in-operation vehicle simulations.

4.2.6. Conclusion

The examples of the Prescriptive Element 213 and the Predictive Element 214 provided can be extrapolated to be applied to many vehicle types, as previously mentioned. With the use of removable attached IMU sensors, all imbalance anomalies of rotating components of vehicles can be solved in a similar method as the wheel example provided. The removably attached diagnostic system would only need the appropriate AI component database to be applied to new vehicles.

Examples provided above focus on vibrations of rotating components and their anomalies due to the universality of rotating components in all vehicles. However, other non-rotating components with vibrations as well as non-vibrational anomalies are within the scope of this invention as the methods for anomaly identification would follow the same methods of AI-driven models trained on known anomalies and algorithms used to optimize data selection for anomaly recognition.

Various processors are involved in the data processing described above. In one preferred embodiment, a first processor is configured to triangulate a location of the axis of rotation of the subsystem or component of the vehicle at any instance of time using motion data collected from a plurality of motion measurement sensors (e.g., IMUs) that are attached to the subsystem or component, thereby defining locations of the axis of rotation at a plurality of successive instances of time. A second processor is configured to determine, using the AI model and the trends of the axis of rotation in the database, points of interest from the locations of the axis of rotation of the subsystem or component at the successive instances of time.

In one embodiment, these two processors (which may be distinct processors or the same processor) are onboard, that is, they are in the PCB 102 of the single sensor device 100. In another embodiment, they are external to the PCB 102 of the single sensor device 100, such as in a cloud computing environment or a remote processing device.

Preferred embodiments of the present invention may be implemented as methods, of which examples have been provided. The acts performed as part of the methods may be ordered in any suitable way. Accordingly, embodiments may be constructed in which acts are performed in an order different than illustrated, which may include performing some acts simultaneously, even though such acts are shown as being sequentially performed in illustrative embodiments.

What is claimed is:

1. A method for anomaly analysis of a rotatable subsystem or rotatable component of a vehicle that experiences mechanical vibration during rotation of the rotatable subsystem or rotatable component using (i) a plurality of inertial measurement units (IMUs) that are attached to the rotatable subsystem or rotatable component, (ii) a database of trends of the axis of rotation and trends of vibrational frequencies of a plurality of different subsystems or components with known anomalies, and (iii) an artificial intelligence (AI) model, the method comprising:
   (a) attaching a removable device containing the plurality of IMUs to the vehicle's rotatable subsystem or rotatable component;
   (b) operating the vehicle;
   (c) triangulating in a first processor a location of the axis of rotation of the rotatable subsystem or rotatable component of the vehicle at any instance of time using motion data collected from the plurality of IMUs that are attached to the rotatable subsystem or rotatable component, thereby defining locations of the axis of rotation at a plurality of successive instances of time;
   (d) determining in a second processor, using the AI model and the trends of the axis of rotation in the database, points of interest from the locations of the axis of rotation of the rotatable subsystem or rotatable component at the successive instances of time;
   (e) identifying the anomaly of the rotatable subsystem or rotatable component using the AI model and the trends of the axis of rotation and trends of vibrational frequencies in the database, wherein the AI model uses the points of interest in its processing;
   (f) generating one or both of (i) a cause of the anomaly, and (ii) a recommended corrective action to be taken to address the anomaly using the AI model, wherein the AI model uses the identified anomaly of the rotatable subsystem or rotatable component in its processing; and
   (g) outputting from the AI model one or both of (i) the cause of the anomaly, and (ii) the recommended corrective action to be taken to address the anomaly.

2. The method of claim 1 wherein one of the points of interest is a natural frequency of the object.

3. The method of claim 1 wherein one of the points of interest is the span around a natural frequency of the object.

4. The method of claim 1 wherein one of the points of interest is a baseline speed of the object.

5. The method of claim 1 wherein the plurality of (IMUs) are removably attached to the subsystem or component.

6. The method of claim 1 wherein the first processor and the second processor are the same processor.

7. The method of claim 1 wherein the triangulation is performed using vector math.

8. An apparatus for anomaly analysis of a rotatable subsystem or rotatable component of a vehicle that experiences mechanical vibration during rotation of the rotatable subsystem or rotatable component using (i) a plurality of inertial measurement units (IMUs) that are removably attached to the rotatable subsystem or rotatable component, (ii) a database of trends of the axis of rotation and trends of vibrational frequencies of a plurality of different subsystems or components with known anomalies, and (iii) an artificial intelligence (AI) model, the apparatus comprising:
   (a) a device containing the plurality of IMUs configured to be removably attached to the vehicle's rotatable subsystem or rotatable component;
   (b) a first processor configured to triangulate a location of the axis of rotation of the rotatable subsystem or rotatable component of the vehicle at any instance of time using motion data collected from the plurality of IMUs that are attached to the rotatable subsystem or rotatable component, thereby defining locations of the axis of rotation at a plurality of successive instances of time; and
   (c) a second processor configured to determine, using the AI model and the trends of the axis of rotation in the database, points of interest from the locations of the axis of rotation of the rotatable subsystem or rotatable component at the successive instances of time,
   wherein the AI model is configured to:
      (i) identify the anomaly of the rotatable subsystem or rotatable component using the trends of the axis of rotation and trends of vibrational frequencies in the database, wherein the AI model uses the points of interest in its processing;
      (ii) generate one or both of (i) a cause of the anomaly, and (ii) a recommended corrective action to be taken to address the anomaly using the AI model, wherein the AI model uses the identified anomaly of the rotatable subsystem or rotatable component in its processing; and
      (iii) output one or both of (i) the cause of the anomaly, and (ii) the recommended corrective action to be taken to address the anomaly.

9. The apparatus of claim 8 wherein one of the points of interest is a natural frequency of the object.

10. The apparatus of claim 8 wherein one of the points of interest is the span around a natural frequency of the object.

11. The apparatus of claim 8 wherein one of the points of interest is a baseline speed of the object.

12. The apparatus of claim 8 wherein the plurality of IMUs are removably attached to the subsystem or component.

13. The apparatus of claim 8 wherein the first processor and the second processor are the same processor.

14. The apparatus of claim 8 wherein the triangulation is performed using vector math.

* * * * *